US012768972B2

(12) United States Patent
Yoo et al.

(10) Patent No.: US 12,768,972 B2
(45) Date of Patent: Oct. 20, 2026

(54) ELECTRONIC DEVICE CAPABLE OF ADAPTIVELY ADJUSTING POWER BASED ON A DISTANCE FROM AN OBJECT AND OPERATING METHOD THEREFOR

(71) Applicant: SAMSUNG ELECTRONICS CO., LTD., Suwon-si (KR)

(72) Inventors: Kyungwoo Yoo, Suwon-si (KR); Hyung Sun Lim, Suwon-si (KR); Dooseok Choi, Suwon-si (KR); Joonhoi Hur, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 406 days.

(21) Appl. No.: 18/223,193

(22) Filed: Jul. 18, 2023

(65) Prior Publication Data

US 2024/0069184 A1 Feb. 29, 2024

(30) Foreign Application Priority Data

Aug. 30, 2022 (KR) ........................ 10-2022-0109418

(51) Int. Cl.
*G01S 13/00* (2006.01)
*G01S 7/35* (2006.01)
(Continued)

(52) U.S. Cl.
CPC .............. *G01S 13/32* (2013.01); *G01S 7/356* (2021.05); *G01S 7/4013* (2021.05); *G01S 13/08* (2013.01); *G01S 13/26* (2013.01); *G01S 13/34* (2013.01)

(58) Field of Classification Search
CPC .......... G01S 13/32; G01S 13/34; G01S 13/08; G01S 13/26; G01S 7/356; G01S 7/4013
(Continued)

(56) References Cited

U.S. PATENT DOCUMENTS 9,176,223 B2 * 11/2015 Derham .................. G01S 13/04
9,310,476 B2 4/2016 Prevo et al.
(Continued)

FOREIGN PATENT DOCUMENTS

EP 3859388 A1 * 8/2021 ............. G01S 13/34
JP 6716956 B2 7/2020
(Continued)

OTHER PUBLICATIONS

Communication dated Jan. 30, 2024, issued by European Patent Office in European Patent Application No. 23183710.5.
(Continued)

*Primary Examiner* — Chuong P Nguyen
(74) *Attorney, Agent, or Firm* — Sughrue Mion, PLLC

(57) ABSTRACT

An electronic device is provided. The electronic device includes: a transceiver configured to transmit or receive a wireless signal; and a processor configured to: control a first detector to detect whether an object is within a first distance range, based on a transmission/reception power ratio of the wireless signal; control a second detector to detect, based on the object not being detected within the first distance range, whether the object is within a second distance range outside the first distance range, based on a chirp pulse, which is obtained by frequency-modulating the wireless signal; and control transmission power of the wireless signal, based on whether the object is detected by the first detector or the second detector.

20 Claims, 15 Drawing Sheets

(51) Int. Cl.

| | |
|---|---|
| ***G01S 7/40*** | (2006.01) |
| ***G01S 13/32*** | (2006.01) |
| *G01S 13/08* | (2006.01) |
| *G01S 13/26* | (2006.01) |
| *G01S 13/34* | (2006.01) |

(58) Field of Classification Search
USPC .................................................. 342/128, 134
See application file for complete search history.

(56) References Cited

U.S. PATENT DOCUMENTS

| | | | | |
|---|---|---|---|---|
| 9,813,997 | B2 * | 11/2017 | Mercer | H04W 52/245 |
| 11,194,032 | B2 | 12/2021 | Cetinoneri et al. | |
| 11,204,410 | B2 | 12/2021 | Jansen et al. | |
| 11,428,798 | B2 * | 8/2022 | Keijer | G01S 13/723 |
| 11,993,309 | B2 * | 5/2024 | Ham | B62D 15/0285 |
| 2018/0287651 | A1 | 10/2018 | Fernando et al. | |
| 2019/0391249 | A1 | 12/2019 | Takeuchi et al. | |
| 2020/0166623 | A1 * | 5/2020 | Sahin | G01S 7/006 |
| 2020/0300996 | A1 * | 9/2020 | Cetinoneri | G01S 7/006 |
| 2020/0326418 | A1 | 10/2020 | Keijer et al. | |
| 2021/0003692 | A1 | 1/2021 | Nohmi | |
| 2024/0072833 | A1 * | 2/2024 | Yoo | H04W 52/367 |

FOREIGN PATENT DOCUMENTS

| | | | |
|---|---|---|---|
| KR | 10-2018-0076814 | A | 7/2018 |
| KR | 10-1957342 | B1 | 3/2019 |
| KR | 10-2126071 | B1 | 6/2020 |

OTHER PUBLICATIONS

Communication dated Jul. 16, 2026, issued by the European Patent Office in European Application No. 23183710.5.

Huawei, "New use case: Sensing for parking space determination", 3GPP TSG-SA WG1 Meeting #99-e, S1-222145, 2022 (4 pages total).

* cited by examiner

ELECTRONIC DEVICE CAPABLE OF ADAPTIVELY ADJUSTING POWER BASED ON A DISTANCE FROM AN OBJECT AND OPERATING METHOD THEREFOR

CROSS-REFERENCE TO RELATED APPLICATION

This application claims priority under 35 U.S.C. § 119 to Korean Patent Application No. 10-2022-0109418, filed on Aug. 30, 2022, in the Korean Intellectual Property Office, the disclosure of which is incorporated by reference herein in its entirety.

BACKGROUND

The present disclosure relates to an electronic device for adaptively adjusting power based on a distance to an object and an operating method thereof.

International organizations, such as the Federal Communications Commission (FCC) and the International Commission on Non-Ionizing Radiation Protection (ICNIRP), regulate the exposure of a radio wave based on a Specific Absence Rate (SAR) and a Power Density (PD). In particular, electromagnetic waves in a millimeter-wave (mmWave) band may be absorbed into the surface of a human body due to the high frequency characteristics thereof. Therefore, for mmWave, the international organizations provide PD radio wave exposure standards.

Because the PD is proportional to the power (effective isotropic radiated power (EIPR)) transmitted from a terminal, the terminal may forcibly reduce the power transmitted to comply with the exposure standards and reduce absorption of the electromagnetic waves into the human body. In particular, electronic devices, such as smartphones, may transmit signals with limited power to satisfy an electromagnetic wave exposure standard for the human body. However, because there is no way to detect the human body within a short distance of the electronic devices, a low signal-to-noise ratio (SNR) may be caused due to unnecessary restriction of transmission power. Accordingly, the communication connection may not be effective, and the terminal may not be efficiently used, due to the low SNR.

SUMMARY

Embodiments of the present disclosure provide an electronic device for detecting a near object using a transmission/reception power ratio-based detection scheme and for detecting an object even within a distance range to deteriorate detection performance when employing the transmission/reception power ratio-based detection scheme, through a frequency modulated continuous wave (FMCW) radar scheme, and an operating method thereof.

According to an aspect of an example embodiment, an electronic device includes: a transceiver configured to transmit or receive a wireless signal; and a processor configured to: control a first detector to detect whether an object is within a first distance range, based on a transmission/reception power ratio of the wireless signal; control a second detector to detect, based on the object not being detected within the first distance range, whether the object is within a second distance range outside the first distance range, based on a chirp pulse, which is obtained by frequency-modulating the wireless signal; and control transmission power of the wireless signal, based on whether the object is detected by the first detector or the second detector.

According to an aspect of an example embodiment, an operating method performed by an electronic device, includes: detecting whether an object is within a first distance range, based on a transmission/reception power ratio of a wireless signal; detecting, based on the object not being detected within the first distance range, whether the object is within a second distance range outside the first distance range, based on a chirp pulse, which is obtained by frequency-modulating the wireless signal; and controlling transmission power of the wireless signal, based on whether the object is detected within the first distance range or the second distance range.

According to an aspect of an example embodiment, an electronic device includes: a transceiver configured to transmit/receive a wireless signal; and a processor configured to: detect whether an object is within a first distance range, based on a transmission/reception power ratio of the wireless signal; detect, based on the object not being detected within the first distance range, whether the object is in a second distance range outside the first distance range, based on a chirp pulse, which is obtained by frequency-modulating the wireless signal; and control transmission power of the wireless signal, based on whether the object is detected within the first distance range or the second distance range.

BRIEF DESCRIPTION OF DRAWINGS

The above and other aspects and features of the present disclosure will be more clearly understood from the following description of example embodiments, taken in conjunction with the accompanying drawings, in which.

DETAILED DESCRIPTION

Hereinafter, example embodiments will be described with reference to the accompanying drawings.

An electronic device according to various example embodiments may be configured to detect an object including a human body or other things, and control power of a wireless signal based on a detection result.

Figure 1:
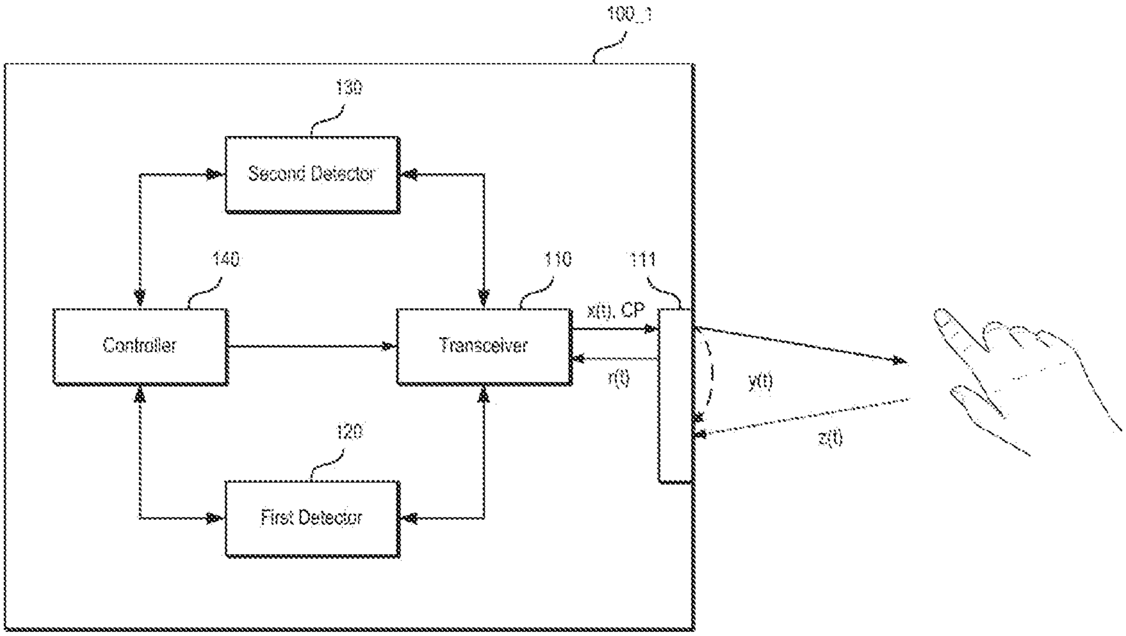
FIG. 1 illustrates an electronic device, according to an example embodiment.

FIG. 1 illustrates an electronic device, according to an example embodiment.

Referring to FIG. 1, an electronic device 100_1 according to an example embodiment includes a transceiver 110, an antenna 111, a first detector 120, a second detector 130, and a controller 140.

The transceiver 110 may connect to various wireless communication systems supporting multiple-input and multiple-output (MIMO), which is a multi-antenna technology, for example, a Long Term Evolution (LTE) system, a LTD Advanced (LTE-A) system, an LTE-A Pro system, or a 5G system suggested in the 3rd Generation Partnership Project (3GPP). The transceiver 110 may transmit and receive a wireless signal with a terminal and a base station. The wireless signal may indicate control information and data. According to example embodiments, the wireless signal may include a pilot signal that is used by the first detector 120 to detect an object. According to example embodiments, the wireless signal may include a chirp or a chirp pulse that is transmitted and received after frequency modulation is performed, and is used by the second detector 130 to detect the object. The wireless signal may include various signals in addition to the above-described signals for detecting the object.

The transceiver 110 may include a transmitter which up-converts and amplifies the frequency of a signal transmitted, and a receiver which low-noise amplifies and down-converts a frequency of a signal received.

The transceiver 110 may be variously configured to transmit and receive a wireless signal through the antenna 111, and may be implemented through, for example, various schemes, such as Intermediate Frequency ICs (IFICs) or Radio Frequency ICs (RFICs). The antenna may include, for example, a patch antenna, a patch antenna array, or other type of antenna used in a wireless device.

A transmission signal "x(t)" is transmitted through the transceiver 110, and a portion of the transmission signal "x(t)" may be reflected from the object and received by the transceiver 110. In this case, a signal reflected from the object may be referred to as a reflection signal "z(t)". In addition, due to incompleteness and characteristics of the transmitter, the portion of the transmission signal "x(t)" may be coupled to the receiver. In this case, the portion of the transmission signal "x(t)" coupled to the receiver may be referred to as a leakage signal "y(t)". The receiver may receive and process a reception signal "r(t)" including the above-described reflection signal "z(t)", the leakage signal "y(t)" and noise "n(t)". Hereinafter, the reception signal "r(t)" may be defined as a signal including the reflection signal "z(t)", the leakage signal "y(t)", and any noise "n(t)".

Alternatively, a chirp pulse CP generated from the second detector 130 may be transmitted and received through the transceiver 110.

The first detector 120 is configured to measure a transmission/reception power ratio from a wireless signal and to detect an object within a first distance range, based on the transmission/reception power ratio.

Specifically, the first detector 120 first transforms the transmission/reception power ratio into data (frequency domain data) in a frequency domain.

The transmission/reception power ratio transformed into the frequency domain data shows different characteristics depending on the movement of the object and on a frequency band, due to the physical characteristic of the object. For example, when the object is a dielectric substance, such as a human body, the transmission/reception power ratio may be changed due to impedance mismatch. In particular, the frequency domain data may have different characteristics when the human body is not present, when the human body is present and does not move, and when the human body is present and moves. Accordingly, the transmission/reception power ratio data transformed into the frequency domain data may be utilized to detect the object. However, in the frequency domain, the characteristic of a high frequency area may not be changed under various situations resulting from the movement of the object, when compared with another frequency area. Therefore, it may be assumed that main frequency components of the transmission/reception power ratio are present in another band, instead of the high frequency area. In this case, components of the high frequency area may be considered as noise.

The first detector 120 may detect the object based on the characteristics of the transmission/reception power ratio in the above-described frequency domain. The first detector 120 may set an adjustable threshold (hereinafter, referred to as a first threshold) for frequency domain data to detect a near object, based on the characteristic of the transmission/reception power ratio in the frequency domain.

The first detector 120 may compare frequency domain data with a first threshold and detect an object depending on the comparison result. For example, when the frequency domain data exceeds the first threshold, the first detector 120 may determine the object is present within a first distance range. When the frequency domain data is less than or equal to the first threshold, the first detector 120 may determine the object is absent.

The second detector 130 is configured to detect the object within a second distance range greater than the first distance range. For example, the second detector 130 may detect the object based on the chirp pulse (CP) obtained by frequency-modulating the wireless signal, when the object is not detected by the first detector 120 (in this regard, when the object is not detected within the first distance range). Detection of the object based on the chirp pulse (CP) may be understood as the detection based on a frequency modulated continuous wave (FMCW) radar.

As described above, the first detector 120, which detects the object based on the transmission/reception power ratio, may detect a near object due to the characteristic of the transmission/reception power ratio. This is because the physical value of the transmission/reception power ratio may be greatly affected by a dielectric substance positioned within a range of several cm (e.g., 2 cm). In this regard, the physical value of the transmission/reception power ratio is not relatively greatly affected by a dielectric constant out of the range of several cm, and therefore may not be sufficient to comply with the FCC exposure regulation. Accordingly, the presence of a human body is not clearly determined, so the detection performance may be deteriorated.

Accordingly, the electronic device 100_1 according to example embodiments may further include the second detector 130, which operates based on an FMCW radar, and may supplement the detection performance of the first detector 120. According to the detection scheme based the FMCW radar, even an object out of a short distance may be detected, which differs from the transmission/reception power ratio-based detection scheme. However, according to the FMCW radar-based detection scheme, when a dielectric substance is present and when the chirp pulse is not radiated smoothly due to the impedance mismatching, the signal processing is difficult. Accordingly, according to the FMCW radar-based detection scheme, the detection performance for the object in the short distance may be deteriorated. This problem may be solved by the first detector 120 according to example embodiments. Accordingly, the first detector 120 and the second detector 130 may be supplemented by each other.

The controller 140 controls transmission power of a wireless signal based on the object detection result. According to an example embodiment, the controller 140 may control the transceiver 110 to transmit the wireless signal with first power, when the object is detected within the range of a first distance. The first power may have a value set to satisfy regulatory criteria which are defined by various regulatory organizations depending on an object.

According to an example embodiment, when an object is detected within the range of a second distance that is outside the range of the first distance, the controller 140 may control the transceiver 110 to transmit the wireless signal with a second power greater than the first power. The second power may have various values according to example embodiments, and the details thereof will be described later.

The electronic device 100_1 according to example embodiments described above may detect a near object through the transmission/reception power ratio-based detection scheme and may detect an object within a distance range, through an FMCW radar-based detection scheme. According to the transmission/reception power ratio-based detection scheme, the characteristic changed by the dielectric substance is utilized. Accordingly, when the object is out of the short distance, the detection performance based on the transmission/reception power ratio-based detection scheme may be deteriorated, which is supplemented by the FMCW radar-based detection scheme. In addition, according to the FMCW radar-based detection scheme, signal processing is difficult in the short distance, which is supplemented by the transmission/reception power ratio-based detection scheme Hereinafter, various example embodiments of a scheme of detecting an object will be described.

Objection Detection Based on Transmission/Reception Power Ratio

Figure 2:
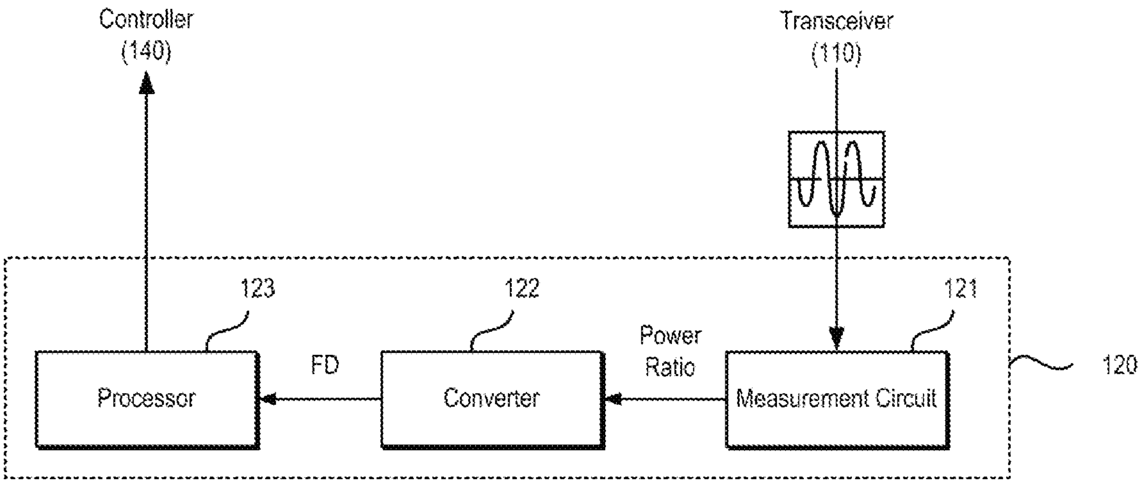
FIG. 2 illustrates a first detector, according to an example embodiment.

FIG. 2 illustrates a first detector according to an example embodiment.

Referring to FIG. 2, the first detector 120 according to an example embodiment includes a first measurement circuit 121, a first converter 122, and a first processor 123.

The first measurement circuit 121 measures a transmission/reception power ratio from a wireless signal. For example, the first measurement circuit 121 may measure the transmission/reception power ratio based on power of the transmission signal "x(t)" and power of the reception signal "r(t)". The transmission/reception power ratio may be defined as a reflection coefficient "Γ", and may be a value defined as a ratio between transmission power and reception power at a specific position. The reflection coefficient may be changed as the surrounding environment changes. For example, a change in the reflection coefficient may be made due to an object being present within a short distance of the electronic device 100_1.

The first measurement circuit 121 may calculate a ratio "$E[|r(t)|^2]/(E[|x(t)|^2]$" of power of the reception signal "r(t)" to power of the transmission signal "x(t)" as the transmission/reception power ratio. In this case, "E[ ]" may be defined as an equation for calculating power or electrical energy of "[ ]". In addition, "$E[|r(t)|^2]$" is an equation for calculating the power of the above-described reception signal "r(t)". As described above, the reception signal "r(t)" may include the reflection signal "z(t)" from the object, the leakage signal "y(t)" coupled from the transmitter to the receiver, and other noises. Accordingly, the transmission/reception power ratio calculated by the first measurement circuit 121 may be mainly changed by an adjacent object (a near object) due to components included in the reception signal "r(t)".

The first converter 122 transforms the transmission/reception power ratio, which is measured by the first measurement circuit 121, into frequency domain data (FD). The first converter 122 may transform a transmission/reception power ratio calculated in the time domain into frequency domain data through Fourier transform. For example, the first converter 122 may transform the transmission/reception power ratio, which is calculated in a time domain, into the frequency domain data through discrete Fourier transform (DFT) defined as $$DFT(s'[n]) = DFT\left(s[n] - \frac{1}{N}\sum_{n=0}^{N-1} s[n]\right) = \sum_{n=0}^{N-1} s'[n]\exp(-j2\pi mn/N).$$

In this case, "s[n]" refers to the transmission/reception power ratio in an n-th time sample defined in the time domain (specifically, a discrete time domain), "N" refers to the total number of time samples subject to the discrete Fourier transform, and "s'[n]" refers to a value obtained by subtracting a mean value from "s[n]".

The operation of the discrete Fourier transform of the first converter 122 described above is provided as an example, and example embodiments are not limited thereto. According to various other example embodiments, the first converter 122 may transform the transmission/reception power ratio into frequency domain data through various Fourier transforms such as fast Fourier transform.

The first converter 122 according to an example embodiment may perform Fourier transform after removing a DC component from a transmission/reception power ratio or may remove the DC component from the Fourier-transformed frequency domain data. Accordingly, only a component for the change in the transmission/reception power ratio may be clearly analyzed in the frequency domain. In addition, because a basic value of the transmission/reception power ratio may be changed under various environments depending on the object, an offset variation resulting from such an environmental change may also be removed.

The first processor 123 may detect the adjacent object, based on the frequency domain data acquired by the first converter 122 and the first threshold.

The first processor 123 according to an example embodiment may perform an operation of detecting an object by considering frequency domain characteristics of the transmission/reception power ratio in the frequency domain, which is transformed by the first converter 122. Specifically, the first processor 123 may set the first threshold, based on the frequency domain characteristic of the transmission/reception power ratio to detect a near object.

According to an example embodiment, the first processor 123 may calculate a noise level based on a noise frequency area, which is regarded as noise, in the above-described frequency domain data, and may set the first threshold based on the calculated noise level and a tuning parameter. In this case, the first threshold may be an adjustable parameter, which changes as the tuning parameter is adjusted by the first processor 123 at the calculated noise level. The first processor 123 may variously set the first threshold by adjusting the tuning parameter.

The first processor 123 according to an example embodiment may set the first threshold with a value suitable for distinguishing between frequency domain data, which corresponds to a situation in which an object is absent, and frequency domain data, which corresponds to a situation in which the object is stationary or moved, based on the frequency domain characteristic of the frequency domain data.

When the frequency domain data exceeds the first threshold, the first processor 123 may determine a near object is present. Alternatively, when the frequency domain data is less than or equal to the first threshold, the first processor 123 may determine the near object is absent.

The first detector 120 according to an example embodiment may detect the near object by utilizing the frequency domain data of the transmission/reception power ratio and the first threshold showing different characteristics depending on the situations of the object. Accordingly, the electronic device 100_1 may control the power of the transmission signal to satisfy power exposure regulations, such as those provided by the FCC, based on the detection result, thereby enabling efficient communication.

Hereinafter a specific operation of the first processor will be described, according to various example embodiments.

Figure 3A:
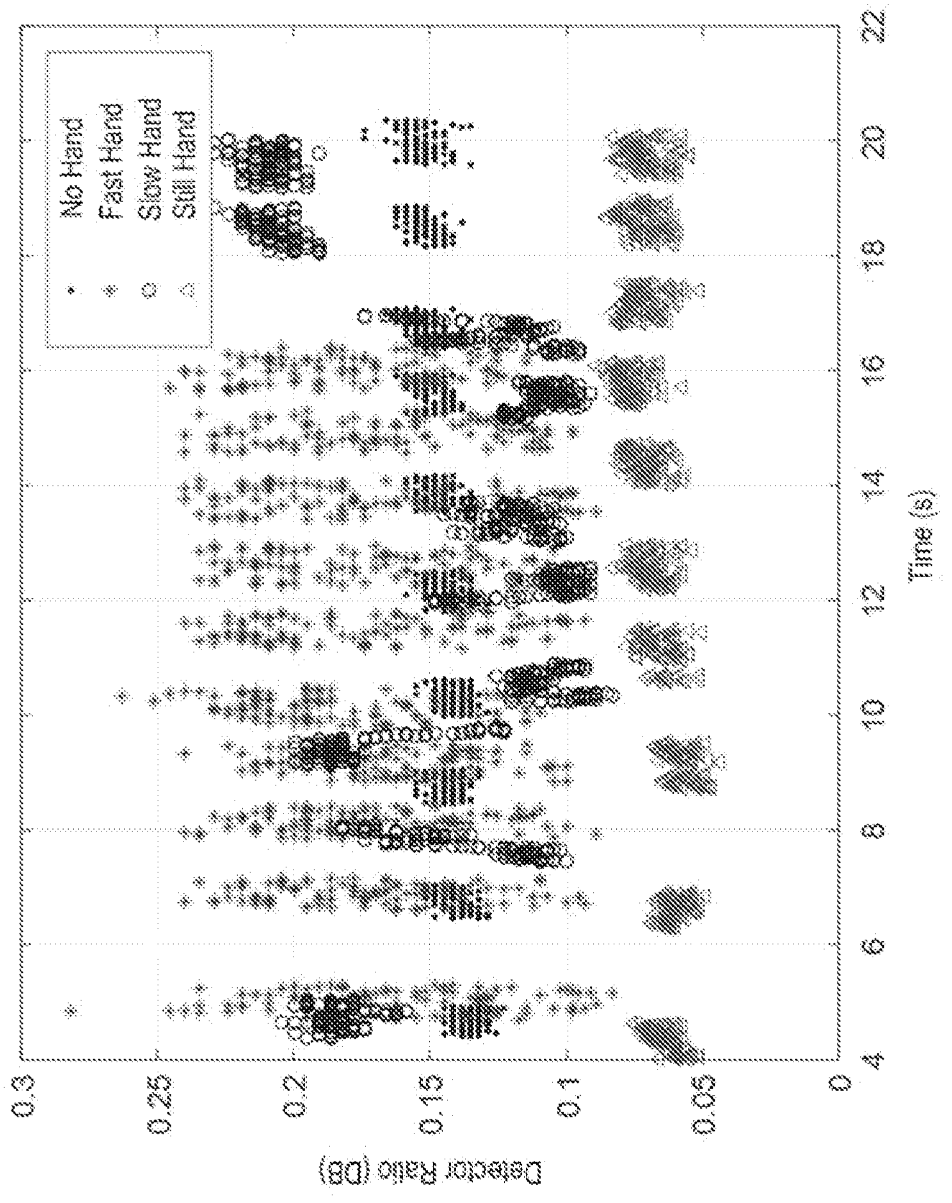
FIGS. 3A and 3B are graphs illustrating a transmission/reception power ratio in a time domain and a frequency domain, respectively, according to example embodiments.
Figure 3B:
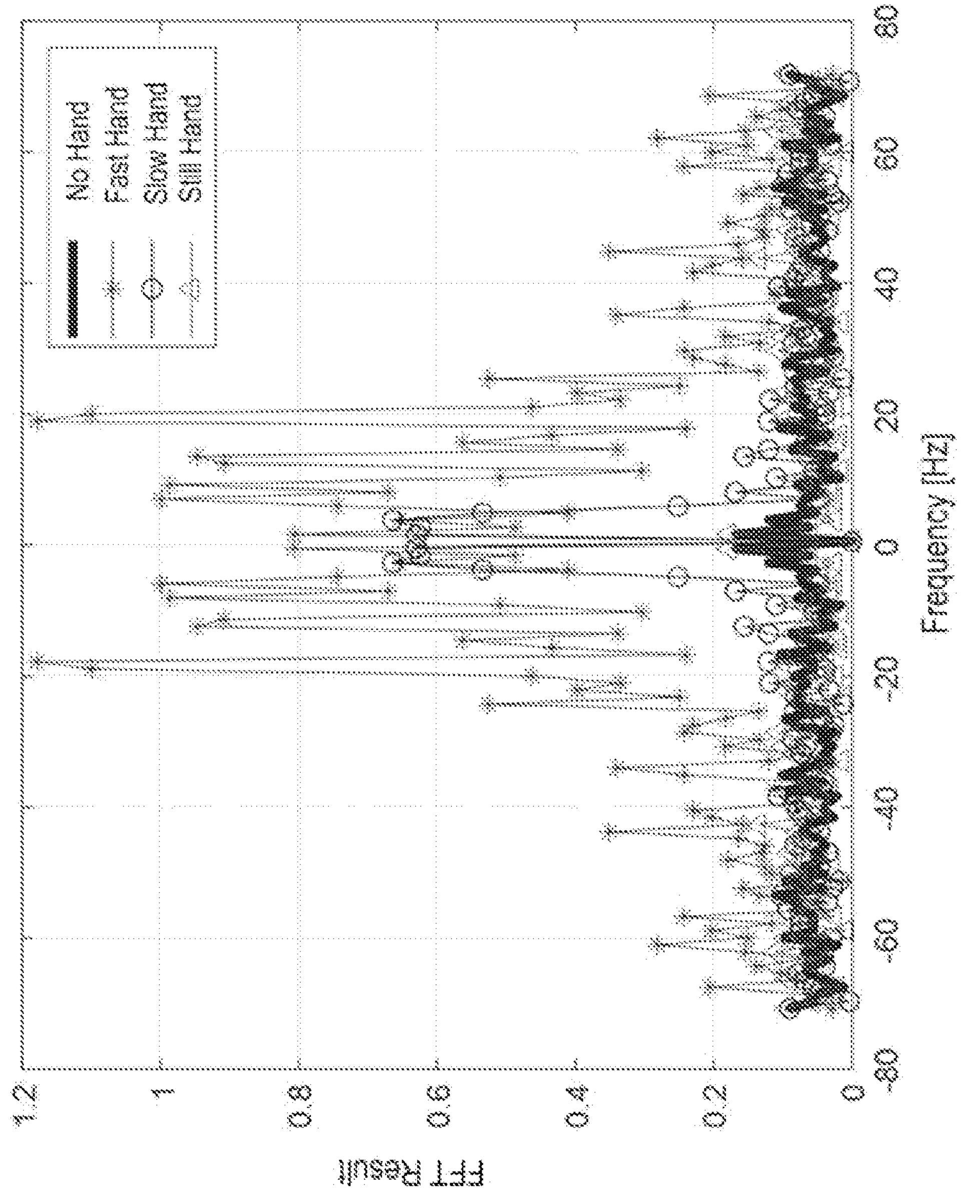

FIGS. 3A and 3B are graphs illustrating a transmission/reception power ratio in a time domain and a frequency domain, respectively, according to example embodiments. In this case, the transmission/reception power ratio is measured when the object is a human hand.

Referring to FIG. 3A, a transmission/reception power ratio may be measured depending on various situations in which an object is changed. For example, various situations may include a situation (no hand) in which a human body is absent from a short distance to the electronic device 100_1, a situation (fast hand) in which the human body moves fast, a situation (slow hand) in which the human body moves slowly, and a situation (still hand) in which the human body is stationary.

The first measurement circuit 121 may measure "N" number of transmission/reception power ratios at specific time intervals. Because the transmission/reception power ratio is measured between transmission/reception wireless signals, time intervals in which the transmission/reception power ratio is are not measured may be varied depending on the situations.

As illustrated, the transmission/reception power ratio is variously changed in the time domain depending on various situations of the object. In particular, when the human body moves, the transmission/reception power ratio is noticeably changed over time, as compared to the situation in which the human body is absent or the situation in which the human body moves slowly. Accordingly, it may be recognized that the transmission/reception power ratios have a diversion distribution. It may be estimated that the characteristic of the transmission/reception power ratio in the time domain is reflected in the frequency domain.

Referring to FIG. 3B, which illustrates frequency domain data for the transmission/reception power ratio of FIG. 3A, it may be recognized that the situations in which the hand is present and moving (fast hand and slow hand) show stronger strength in specific frequency areas, when compared to other situations. To the contrary, it may be recognized that the transmission/reception ratios are uniformly distributed throughout the whole frequency areas under the situations in which the hand is present and still or not present (still hand and no hand) in which the low distribution is shown.

For example, when the human body moves slowly, the component of the low frequency area is greatly shown, instead of a DC component. When the human body moves fast, greater frequency domain data is present in the high frequency area. In addition, even when the human body does not move, a signal is detected in a low frequency area due to a fine change, instead of the DC component.

The signal strength is minimal in the high frequency domain except when the human body moves fast. Accordingly, it may be determined that the change in the transmission/reception power ratio resulting from the slow hand has no high frequency characteristic. In addition, even if the human body moves fast, the frequency component has a greater strength in the low frequency domain than in the high frequency domain. In summary, frequency domain data obtained in various environments as illustrated in FIG. 3B is less changed by the movement of the human body in a specific high frequency range, in common. Accordingly, it may be assumed that a component resulting from noise is mainly present in the high frequency area. Accordingly, the noise level may be estimated from the frequency domain data in the high frequency area.

For example, in FIG. 3B, when the set of frequency domain data included in the high frequency area is defined as a noise frequency area, the first processor 123 may calculate the noise level, based on the noise frequency area. According to an example embodiment, the first processor 123 may calculate the noise level based on the noise data, which corresponds to the noise frequency area of the frequency domain data, and based on $$\text{noise}(\underline{P}_k) = \frac{1}{N_{noise}} \sum_{m=1}^{N_{noise}} \underline{P}_k(m).$$

In this case, noise($\underline{P}_k$) denotes the noise level, $N_{noise}$ denotes the coefficient of a discrete frequency component used when calculating the noise level, $\underline{P}_k$(m) denotes frequency domain data, that is, Fourier-transformed result, at a "k" time, and "m" denotes a frequency index.

According to an example embodiment, the first converter 122 may perform Fourier transform at a short sampling period (e.g., a sampling period defined below a set first threshold), such that the first processor 123 calculates the noise level. When the moving speed of the human body increases, a high transmission/reception power ratio may exist in the high frequency area, which may cause an error in calculating the noise level. To the contrary, when Fourier transform is performed at the short sampling period according to example embodiments described above, only noise components may be present in the high frequency area, which may reduce an error in calculating the noise level. According to an example embodiment, the first threshold for the above-described sampling period may be set based on the moving speed of the object.

The first processor 123 may set the first threshold based on the calculated noise level and the tuning parameter. The first threshold is a parameter related to the noise level, and may be adjusted in size, as the tuning parameter is adjusted. In this regard, the tuning parameter may be used as a parameter for adjusting the size of the first threshold.

The first processor 123 according to an example embodiment may adjust the first threshold and the detection rate of the object by adjusting the tuning parameter.

Figure 4:
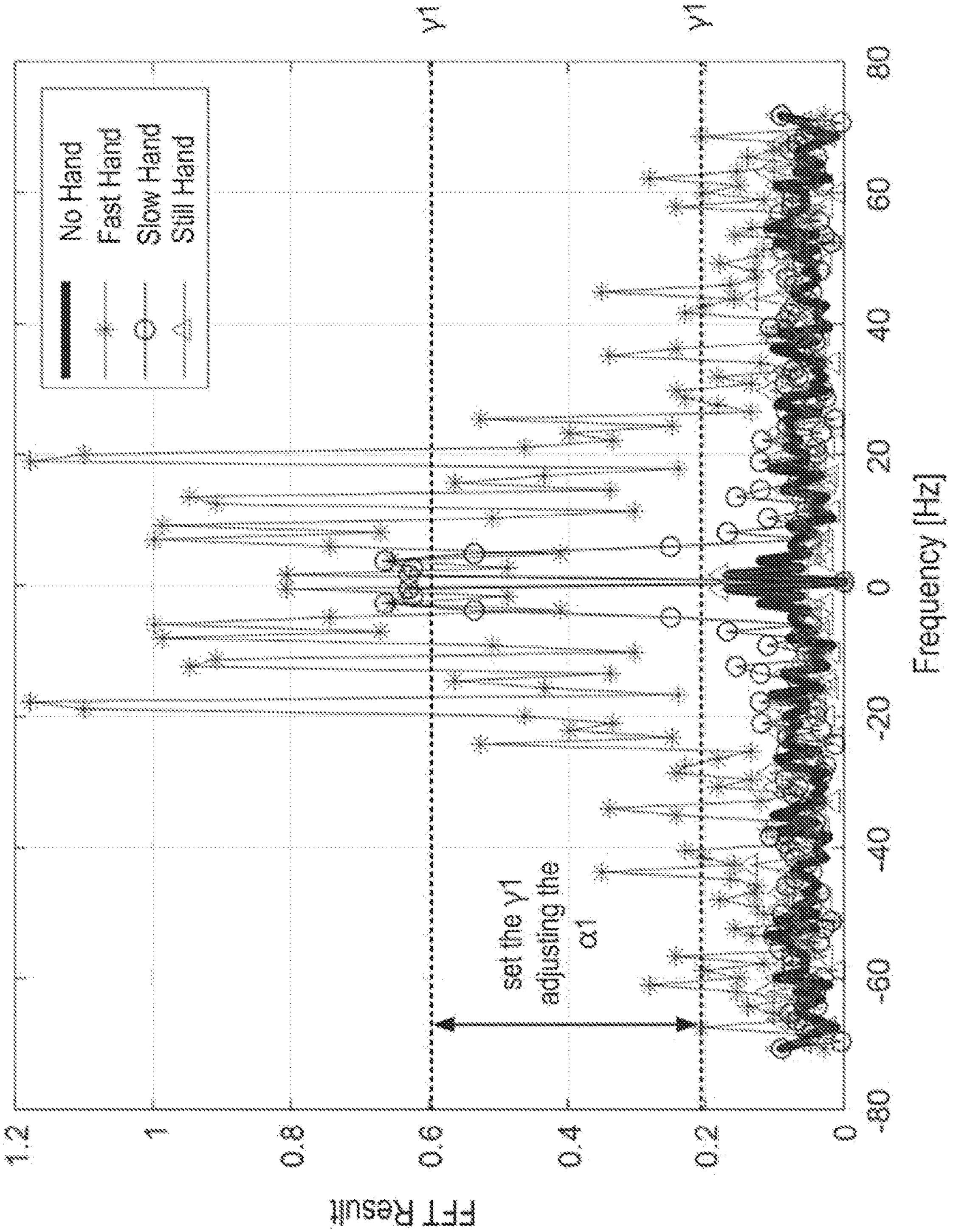
FIG. 4 illustrates an operation of adjusting a threshold, according to an example embodiment.

FIG. 4 illustrates an operation of adjusting a threshold, according to an example embodiment.

Referring to FIG. 4, according to an example embodiment, the first processor 123 may set the first threshold "γ1" to a higher value by adjusting the tuning parameter "α1" to a greater value, or may decrease the first threshold to a lower value by adjusting the tuning parameter to a lesser value. When the tuning parameter is adjusted to the greater value, the first processor 123 may determine the object is present, when there is frequency domain data having a value greater than the first threshold. Accordingly, even though the rate (non-detection rate) in which the object is not detected is relatively increased, the rate (erroneous detection rate) in which the object is erroneously detected may be decreased. To the contrary, when the tuning parameter is adjusted to the lesser value, the first processor 123 may determine that an object is present even if there is relatively small frequency domain data compared to the case with a large first threshold. Accordingly, although the erroneous detection rate of the object is relatively increased, the non-detection rate may be reduced.

In this case, the non-detection rate for the object of the first processor 123 may be the sensitivity for detecting the object. For example, when the transmission power of the transceiver 110 needs to be lowered as the object is a human body, it is necessary to more sensitively detect the human body. Accordingly, the first processor 123 may reduce the first threshold by adjusting the tuning parameter to a lesser value, such that the non-detection rate is reduced.

As an example embodiment, when any human body is absent from the short distance and when the transmission/reception power ratio data follows or is assumed to follow Gaussian distribution in the time domain, the transmission/reception power ratio data follows chi-squared distribution in the frequency domain. Accordingly, the first processor 123 may set the first threshold based on $\gamma=\alpha N\sigma^2$. In this case, "γ" denotes the first threshold, "α" denotes a tuning parameter, and $N\sigma^2$ corresponds to the noise level described above, "N" denotes the total number of samples in the frequency domain, and "σ" refers to the standard deviation of the Gaussian distribution followed by the transmission/reception power ratio data in the time domain. The first processor 123 may set "γ" by adjusting "α", and may adjust the erroneous detection rate and the non-detection rate of the object by adjusting "α" to a higher value or a lower value as described above.

As described above, according to an example embodiment, the electronic device 100_1 may adjust the erroneous detection rate and the non-detection rate of the object, as the first threshold is variously set by adjusting the tuning parameter. When the first threshold is set to a fixed value, and when the variance of the transmission/reception power ratio data changes due to the aging or deterioration of a terminal, or due to changes in the surrounding situation, the countermeasures against the situations is difficult. Accordingly, the probability in which an object is not detected or erroneously detected may be increased. However, as described above, the electronic device 100_1 according to an example embodiment may adaptively detect an object by identifying the first threshold based on a noise frequency area in which the influence of a surrounding dielectric substance, such as a human body, is insignificant, and comparing the first threshold with data in a low frequency area or an intermediate frequency area in which the influence by the dielectric substance is significant. In addition, when the object is a human body, the object should be detected more sensitively to satisfy various power regulations. In this case, the electronic device 100_1 may reduce the non-detection rate and detect the human body more sensitively, by reducing the first threshold by adjusting the tuning parameter to a lower level.

As described above, the first processor 123 may set the first threshold according to various example embodiments. The first processor 123 sets the first threshold and detects an object adjacent to the electronic device 100_1 based on the set first threshold.

Figure 5:
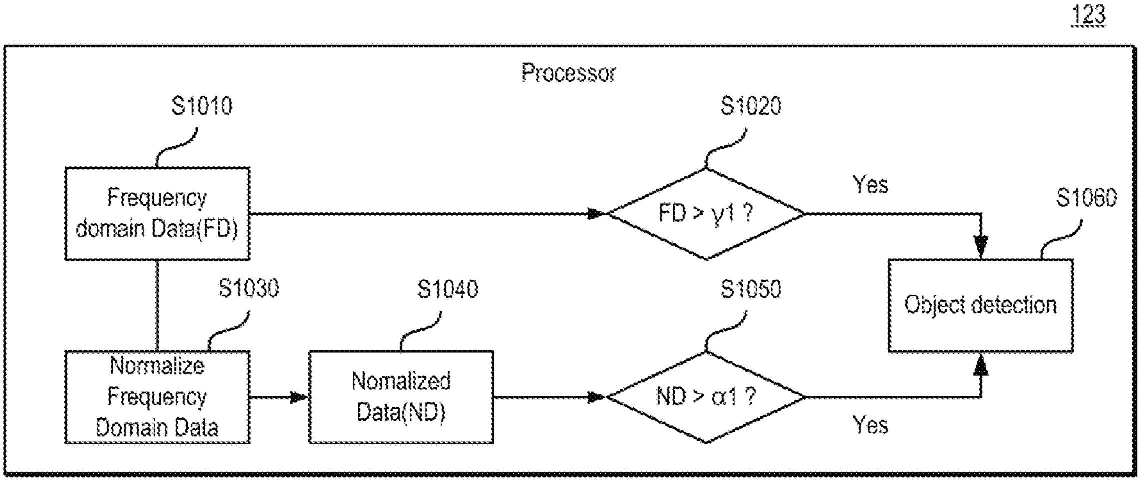
FIG. 5 is a flowchart illustrating an operation of recognizing an object in a first, according to an example embodiment.

FIG. 5 is a flowchart illustrating an operation of recognizing an object of a first detector, according to an example embodiment.

Referring to FIG. 5, the frequency domain data FD may be acquired from the converter (S1010).

According to an example embodiment, the first detector 120 determines whether the frequency domain data FD exceeds the first threshold "γ1" (S1020). When the frequency domain data FD exceeds the first threshold "γ1", the first detector 120 may determine that an adjacent object is present, and when the frequency domain data FD is less than or equal to the first threshold "γ1", the first detector 120 may determine the adjacent object is absent (S1060). In this case, when at least one frequency component of the frequency domain data FD exceeds the first threshold "γ1", the first detector 120 may determine the adjacent object is present. In this regard, the first detector 120 may determine the adjacent object is present, when any one frequency component of the frequency domain data FD exceeds the first threshold "γ1".

Alternatively, the first detector 120 according to an example embodiment may normalize the frequency domain data FD based on a noise level (S1030). For example, the first detector 120 may normalize the frequency domain data FD by dividing the size of the frequency domain data FD by the noise level. The first detector 120 may obtain normalized data ND through normalization (S1040). The first detector 120 determines whether the normalization data ND exceeds a tuning parameter "α1" (S1050). When the normalization data ND exceeds the tuning parameter "α1", the first detector 120 may determine the adjacent object is present, and when the normalization data ND is less than or equal to the tuning parameter "α1", the first detector 120 may determine the adjacent object is absent (S1060).

The first detector 120 according to an example embodiment may perform the above-described operation of recognizing the object for a specific sample duration to accurately detect a human body which is stationary or moves slowly enough to be determined as a DC component.

Specifically, when the object is the human body, the first detector 120 may set a maximum sample interval ($T_{max}$, $s_{tan}$) defined as a maximum stop time of the human body. In this regard, the maximum sample interval ($T_{max}$, $s_{tan}$) refers to the maximum time period at which the human body may be completely stop. For example, the first detector 120 may set the maximum sample interval ($T_{max}$, stan), based on the transmission/reception power ratio data collected in various situations in which the human body is stationary.

The first detector 120 may recognize the object according to example embodiments described above by utilizing the data history included in the maximum sample interval ($T_{max,\ stan}$). For example, the first detector 120 may immediately determine the human body is present, when any one frequency domain data exceeds the first threshold or one normalized data exceeds the tuning parameter during the maximum sample interval ($T_{max,\ stan}$).

When determining an object is absent during the maximum sample interval, the first detector 120 according to an example embodiment may transmit a wireless signal with the second power greater than the first power.

According to example embodiments described above, the first detector 120 may set the maximum sample interval and utilize a data history in the maximum sample interval to recognize the object. Accordingly, the first detector 120 may determine the object by effectively distinguishing between when the surrounding object is stationary (for example, a stationary object) or when the surrounding object is a movable object (for example, a human body).

The first detector 120 according to example embodiments described above detects an object by using frequency domain data of the transmission/reception power ratio and an adjustable first threshold, and thus controls the power of a wireless signal to satisfy power exposure regulations while maintaining effective communication. In particular, according to example embodiments, as the first threshold may be adaptively adjusted, the countermeasures may be made against the change in transmission/reception power ratio data resulting from the change in a terminal situation or a surrounding situation. In addition, as the first threshold is adjusted, the detection rate of the object may be adjusted such that an object, such as a human body, may be detected with high sensitivity. In addition, according to example embodiments, the human body in a substantially stationary state may be detected by utilizing the maximum sample interval.

FMCW Radar Based Object Detection

Figure 6:
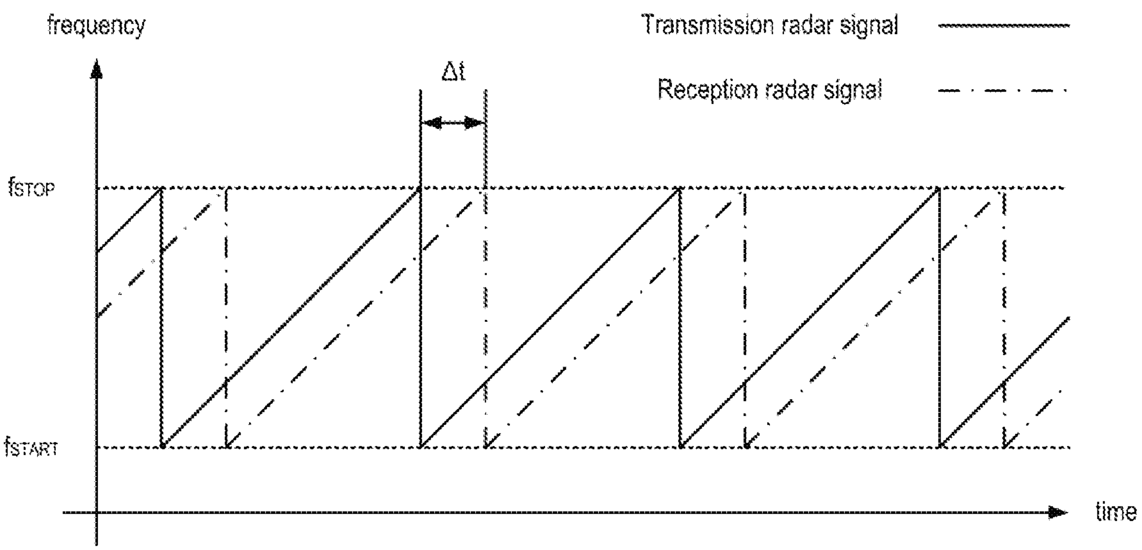
FIG. 6 illustrates an FMCW signal.

FIG. 6 illustrates an FMCW signal.

Referring to FIG. 6, various types of frequency modulation (FM) schemes may be used for a frequency-modulated continuous wave radar (FMCW) signal. For example, a radar signal may be frequency-modulated depending on a sine waveform, a sawtooth waveform, or a triangular waveform. As illustrated, the frequency of a transmission radar signal and the frequency of a reception radar signal may be linearly increased from a start frequency $f_{START}$ to a stop frequency $f_{STOP}$, decreased to the $f_{START}$ again, and then increased again until the frequency of the transmission radar signal and the frequency of the reception radar signal reach the stop frequency $f_{STOP}$.

The transmission radar signal may have the sequence of frequency ramps referred to as a 'chirp' or 'chirp pulse'. According to an example embodiment, a pre-defined modulation pause signal may be inserted between multiple subsequent 'chirps', and the frequency of the radar signal may be maintained at the stop frequency or the start frequency during the stop phase (or any frequency between the stop and start frequencies). The duration of one chirp may range from several microseconds to several milliseconds.

The reception radar signal may be referred to as a radar echo. The received radar signal has a time delay "Δt" when compared to the transmission radar signal, due to the travel time from an antenna to a radar target and again from the radar target to the antenna. The radar may calculate the distance to the radar target by calculating the time delay "Δt".

Although the basic operating principle of the FMCW radar has been disclosed as described above, more sophisticated signal processing may actually be applied. In particular, because an additional frequency shift of the transmission signal resulting from the Doppler effect is added to the frequency shift due to the travel time of the above-mentioned radar signal, the Doppler shift may cause errors when measuring a distance. According to an example embodiment, the Doppler shift may be estimated from a transmission/reception radar signal, or may be negligible for distance measurement.

Figure 7:
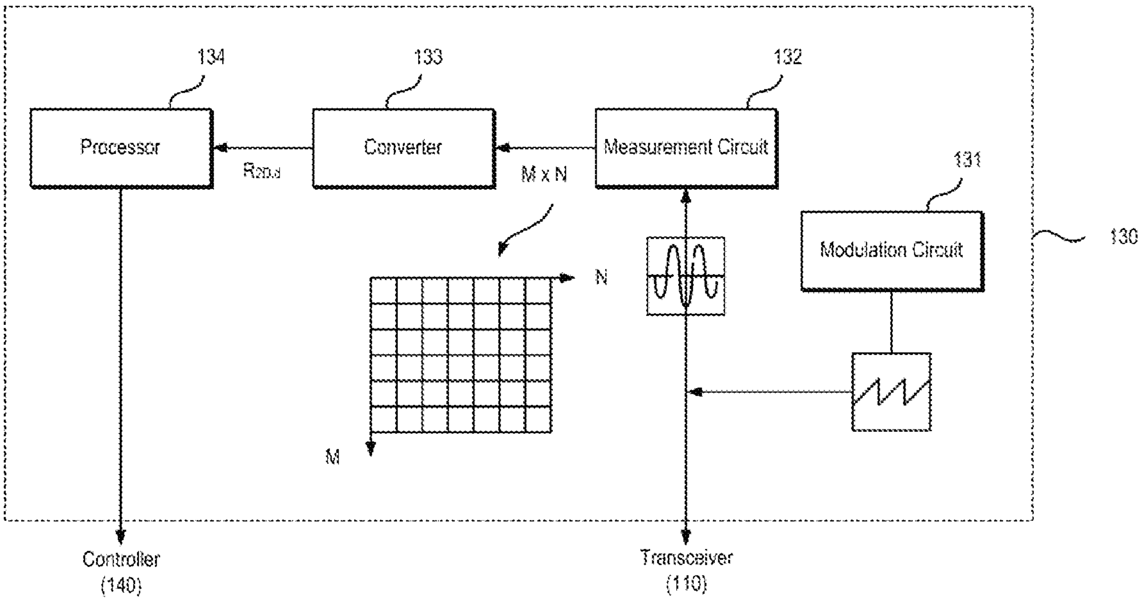
FIG. 7 illustrates a second detector, according to an example embodiment.

FIG. 7 illustrates a second detector, according to an example embodiment.

Referring to FIG. 7, the second detector 130 according to an example embodiment includes a modulation circuit 131, a second measurement circuit 132, a second converter 133, and a second processor 134.

The second detector 130 may generate a chirp pulse by frequency-modulating a radio signal, transmit the chirp pulse continuously through the transceiver 110, and obtain target information by mixing a sample of the transmitted signal with the reception radar signal delayed from a radar target. The target information may include, for example, a distance or a speed of the target. When the radar target is moving, the speed information of the radar target should be identified. To this end, the above-described Doppler effect should be considered.

The modulation circuit 131 generates a chirp pulse, which is as illustrated in FIG. 6, based on the wireless signal. The modulation circuit 131 may generate "M" number of chirp pulses through frequency modulation during a burst which is one transmission unit. The modulation circuit 131 may transmit the generated "M" number of chirp pulses to the transceiver 110, and the transceiver 110 may transmit "M" number of chirp pulses. Each chirp pulse may include "N" number of samples.

The second measurement circuit 132 measures the magnitude of the reception radar signal corresponding to the transmitted "M" number of chirp pulses. As illustrated in FIG. 7, "M" number of chirp pulses may be a vertical column of an M×N matrix by way of example, and "N" number of samples included in each chirp pulse may be a horizontal row in the M×N matrix. Therefore, the vertical column may be viewed as a slow time axis, and the horizontal column may be viewed as a fast time axis. In addition, because the vertical column may correspond to one burst for detecting an object, the vertical column may be viewed as the entire observation time "$T_{obs}$" axis. The M×N matrix shows the magnitude of the reception radar signal measured by the second measurement circuit 132 for each concatenation pulse and each sample. The M×N matrix has a dimension corresponding to the number of transmission chirp pulses and a dimension corresponding to the number of samples included in each chirp pulse.

The second converter 133 may apply 2D Fourier transform to the M×N matrix. In this regard, the second converter 133 performs 2D Fourier transform with respect to the chirp pulse, in the dimension corresponding to the number of transmission chirp pulses and the dimension corresponding to the number of samples included in each chirp pulse. For example, the electronic device 100_1 may obtain range information through range compression for applying Fourier transform along a fast time axis, that is, a horizontal column. The range compression refers to converting the remaining range to a noise level except for a signal existing in a range. Thereafter, the electronic device 100_1 may obtain Doppler information through Doppler compression applying Fourier transform along the slow time axis, that is, the vertical column. The M×N matrix transformed to include range information and Doppler information through 2D Fourier transform may also be referred to as a range-Doppler map.

Finally, the second converter 133 may obtain $R_{2D,d}$, which is the 2D Fourier transform result indicating the information on a range having a target and Doppler information, through 2D Fourier transform described above. As described above, $R_{2D,d}$ may be expressed as $R_{2D,d[m,n]}$ because $R_{2D,d}$ is a matrix in an M×N size, where "m"="0" to "M−1", and "n"="0" to "N−1".

The second processor 134 detects an object, based on a 2D Fourier transform result and a second threshold for the 2D Fourier transform result.

According to an example embodiment, the second processor 134 may calculate a noise level based on the 2D Fourier transform result, and set the second threshold, based on the calculated noise level. When selecting a component from the 2D Fourier transform result, the second processor 134 may calculate a noise level based on a neighboring component of the selected component. The second processor 134 may appropriately set the second threshold to detect the object within the second distance range, based on a scaling factor referred to as a noise level and a threshold factor calculated. For example, the second processor 134 may set the second threshold, based on a Constant False Alarm Rate (CFAR) algorithm such as Cell Average (CA) (CFAR) or Ordered Statistic (OS) CFAR, but example embodiments are not limited thereto.

When the 2D Fourier transform result exceeds the second threshold, the second processor 134 may determine an object is present within the second distance range. Alternatively, when the 2D Fourier transform result is less than or equal to the second threshold, the second processor 134 may determine the object is absent.

As described above, according to example embodiments, the second detector 130 employs an FMCW radar-based detection scheme to detect an object even in a distance range in which the detection performance of the transmission/reception power ratio-based detection scheme is deteriorated. Accordingly, the detection performance of the first detector 120 may be supplemented.

Figure 8:
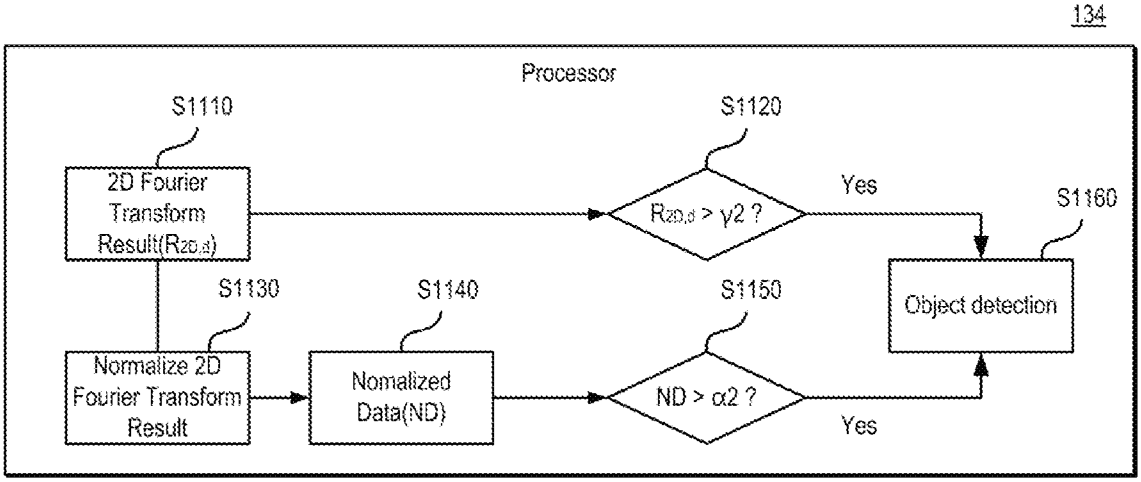
FIG. 8 is a flowchart illustrating an operation of recognizing an object in a second detector, according to an example embodiment.

FIG. 8 is a flowchart illustrating an operation of recognizing an object in a second detector, according to an example embodiment.

Referring to FIG. 8, the second processor 134 may obtain a 2D Fourier transform result from the converter (S1110).

The second processor 134 according to an example embodiment determines whether the 2D Fourier transform result exceeds the second threshold "γ2" (S1120). When the 2D Fourier transform result exceeds the second threshold "γ2", the second processor 134 may determine an adjacent object is present, and may determine the object is absent when the 2D Fourier transform result is less than or equal to the second threshold "γ2" (S1160). In this case, when at least one component of the 2D Fourier transform result exceeds the second threshold "γ2", the second processor 134 may determine the adjacent object is present. In this regard, the second processor 134 may determine the adjacent object is present when any one of the components of the 2D Fourier transform result exceeds the second threshold "γ2".

Alternatively, according to an example embodiment, the second processor 134 may normalize the 2D Fourier transform result to a noise level (S1130). For example, the second processor 134 may normalize the 2D Fourier transform result by dividing the size of the 2D Fourier transform result into the noise level. The second processor 134 may obtain normalized data ND through normalization (S1140). The second processor 134 determines whether the normalized data ND exceeds a threshold factor "α2" (S1150). The second processor 134 may determine that adjacent object is present, when the normalized data ND exceeds the threshold factor "α2", and may determine the adjacent object is absent when the normalized data ND is less than or equal to the threshold factor "α2".

The second processor 134 according to an example embodiment may perform the above-described operation of recognizing an object during a specific sample duration, to accurately determine a human body which is stationary or moves slowly enough to be determined as a DC component.

Specifically, when the object is a human body, the second processor 134 may set the maximum sample interval ($T_{max\ stan}$) defined as the maximum stopping time of the human body, which is similar to the operation in the first detector 120.

The second processor 134 may recognize the object based on example embodiments described above during the maximum sample interval ($T_{max,\ stan}$). For example, the second processor 134 may immediately determine the human body is present when any one component of the 2D Fourier transform result exceeds the second threshold or one piece of normalized data exceeds the threshold factor during the maximum sample interval ($T_{max,\ stan}$).

According to example embodiments described above, the second detector 130 may set the maximum sample interval and recognize the object to effectively distinguish between when a surrounding object completely stops (a fixed object) and is movable (e.g., a human body) for determination. In particular, even if the radial velocity of the object is "0", the second detector 130 may detect the human body is stationary by using a data history within the maximum sample interval.

As described above, according to example embodiments, the maximum sample interval may be set for each of the first detector 120 and the second detector 130, or may be set to an equal value for of the first detector 120 and the second detector 130.

According to an example embodiment, the second detector 130 may perform an operation of detecting an object according to example embodiments described above during an observation time "$T_{obs}$". The modulation circuit 131 may generate a chirp pulse only in the time domain corresponding to the observation time "$T_{obs}$". Accordingly, the transceiver 110 may transmit or receive the chirp pulse only during the observation time "$T_{obs}$".

For example, when the electronic device 100_1 is a terminal, the second detector 130 should perform an FMCW radar-based detection operation without interrupting communication (e.g., UpLink (UL) or DownLink (DL)). Accordingly, the second detector 130 may perform an operation of detecting an object by utilizing a gap time. The gap time may be defined in, for example, following Table 1.

TABLE 1

| | UGL[ms] | GRP[ms] | GL/UGRP |
|---|---|---|---|
| LGP #0 | 1.0 | 1.0 | 5% |
| ULGP #1 | 1.0 | 40 | 2.5% |
| ULGP #2 | 0.5 | 160 | ~0.31% |
| ULGP #3 | 0.125 | 5 | 2.5% |

Figure 9:
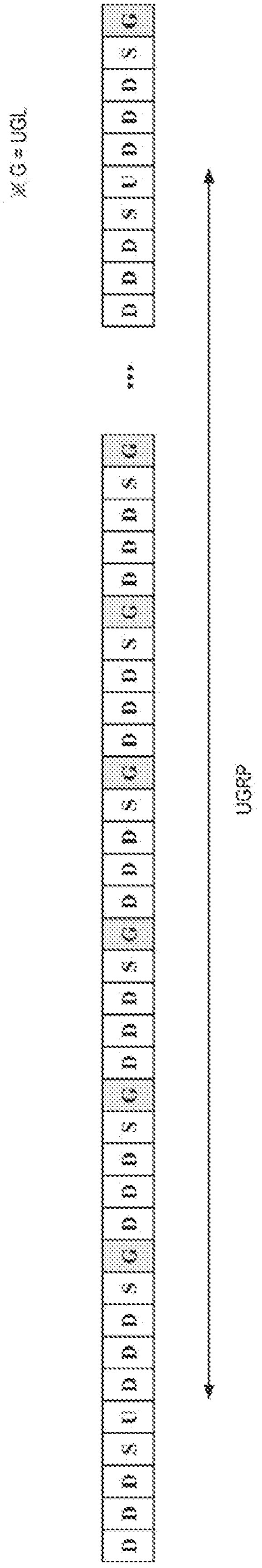
FIG. 9 illustrates an observation time.

In Table 1, Uplink Gap Length (UGL) denotes the length of the gap of the UL signal in one iteration period, Uplink Gap Repetition Periodicity (UGRP) denotes the length of the gap of the UL signal in the entire iteration period, and ULGP denotes the gap setting of the UL signal. FIG. 9 illustrates the observation time.

Specifically, FIG. 9 illustrates ULGP #1 in Table 1. Referring to FIG. 9, 'D' means DL, 'U' means UL, and 'S' means special slot. 1 ms of UGL may be included in total during 40 ms, and may be divided into 8 slots. Accordingly, each gap time is 0.125 ms. Based on one UGRP defined according to the ULGP, the next time area UGRP may be changed according to a change in scheduling between the terminal and the base station. Accordingly, the total observation time for the FMCW radar-based detection operation may be the time length of one UGRP in consideration of the above uncertainty. For example, for ULGP #1 as illustrated in FIG. 9, the observation time is 40 ms.

According to an example embodiment, the electronic device 100_1 may transmit and receive a chirp pulse during a gap time defined depending on the ULGP described above. For example, the resolution of the radial velocity of the second detector 130 depending on the transmission and reception of the concatenated pulse in the gap time based on ULGP #1 may be calculated as 12.5 cm/s based on the center frequency of 30 GHz. For example, the radial velocity resolution of the second detector 130 depending on transmission and reception of the chirp pulse in the gap time based on ULGP #2 may be 3.12 cm/s. In this regard, among the gap settings based on ULGP, as the UGRP is increased, the radial velocity resolution may be improved.

Therefore, the electronic device 100_1 according to an example embodiment may adjust the resolution of the radial velocity depending on various gap settings based on ULGP. In particular, as the resolution of the radial velocity is increased, the detection performance of the object within the second distance range may be improved.

Power Control Based on Detection Results

As described above, when an object is detected by the first detector 120 and the second detector 130 according to various example embodiments, the controller 140 controls the transmission power of the wireless signal depending on the object detection result.

According to an example embodiment, when determining an object is present within a first distance range, the controller 140 transmits a wireless signal with the first power.

According to an example embodiment, when determining the object is present within the second distance range, the controller 140 transmits a wireless signal with the second power.

According to an example embodiment, the controller 140 may control the second power, which is the power of the transmission signal, based on the distance resolution of the second detector 130 when the object is detected within the second distance range. For example, the controller 140 may calculate the distance resolution of the second detector 130 based on $$\Delta K = \frac{c}{2B}.$$

The controller 140 may compare the calculated distance resolution with a preset distance resolution value and control the second power depending on the comparison result.

Figure 10A:
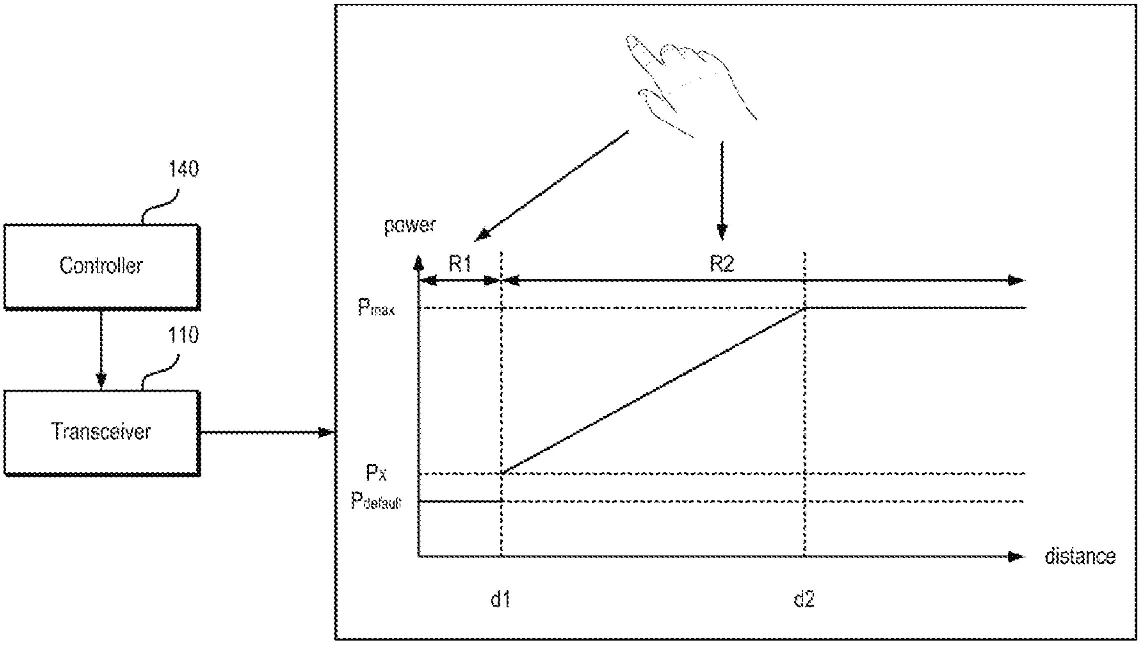
FIGS. 10A and 10B illustrate a power control operation of a controller, according to various example embodiments.
Figure 10B:
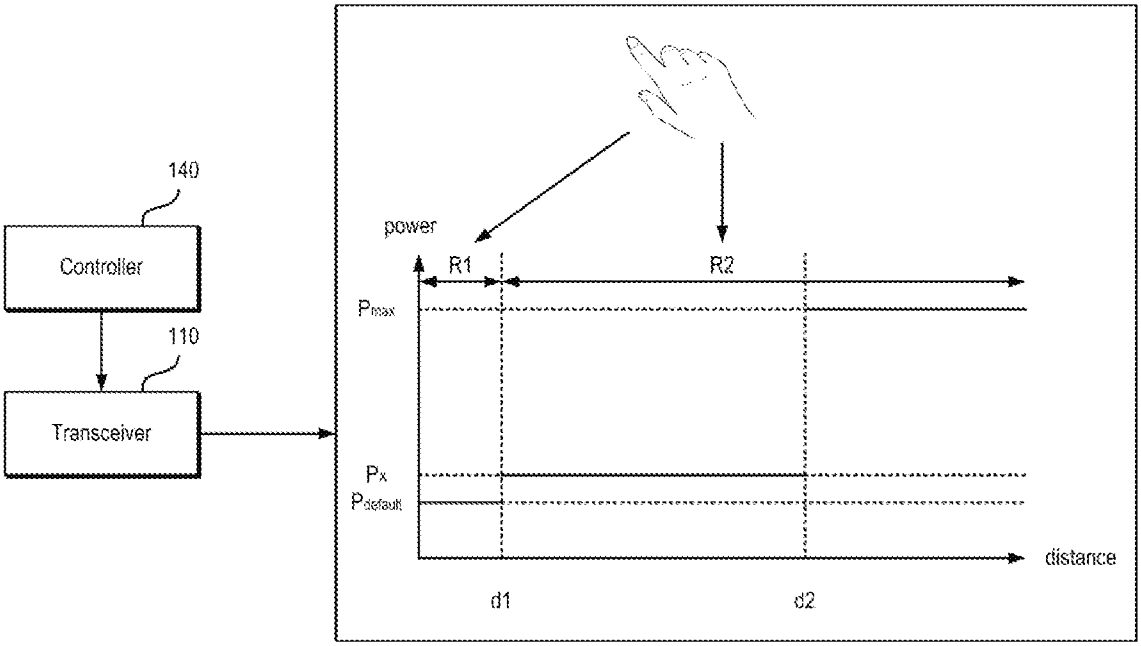

FIGS. 10A and 10B illustrate a power control operation of a controller, according to various example embodiments.

First, referring to FIG. 10A the controller 140 controls the transceiver 110 to transmit a wireless signal with first power "$P_{default}$", which is basic power, when an object is detected within a first distance range "R1" defined as a distance range within a distance "d1" by the first detector 120.

The controller 140 may linearly control the second power to the maximum output power, when the object is detected within a second distance range "R2" defined as a distance range after the distance "d1", and when the calculated distance resolution is less than the preset distance resolution value. For example, the controller 140 linearly controls the second power from power (PX) to the maximum output power "$P_{max}$" of the transceiver 110. In this case, the controller 140 may linearly increase the second power to the distance "d2" set to satisfy the regulation on the object even if the maximum output power "$P_{max}$" is output.

For example, the power PX may be a power greater than the first power by 4 dB. Alternatively, the controller 140 may set the strength of the power "PX", based on the FCC regulation or various standards for defining other power regulations of the wireless signal for the human body, in addition to 4 dB.

Next, referring to FIG. 10B, the controller 140 operates in the same manner as in FIG. 10A, when an object is detected within a range of the first distance R1. However, the controller 140 controls the second power to the maximum output "$P_{max}$" only when the object is detected in the maximum distance range (the distance range after the distance "d2" included in the second distance range "R2"), on the assumption that the object is detected in the second distance range "R2", and the distance resolution is equal to or greater than the preset distance resolution value, which is different from the case illustrated in FIG. 10A. The controller 140 controls the second power to the power "PX", when the object is detected within a distance range defined as the range from the distance "d1" to the distance "d2" in the second distance range "R2", As described above, according to an example embodiment, the controller 140 according to example embodiments may efficiently control power of a wireless signal while satisfying a power regulation, depending on the distance of the object detected by the first detector 120 and the second detector 130. For example, when the object is detected within a short distance, the controller 140 may control power to satisfy a regulation on the object. When the object is detected outside the short distance, the controller 140 may effectively control power depending on the performance of the distance resolution while satisfying regulations.

Operating Method

Hereinafter, an operating method according to various example embodiments described above will be described. The duplication thereof will be omitted to avoid redundancy.

Figure 11:
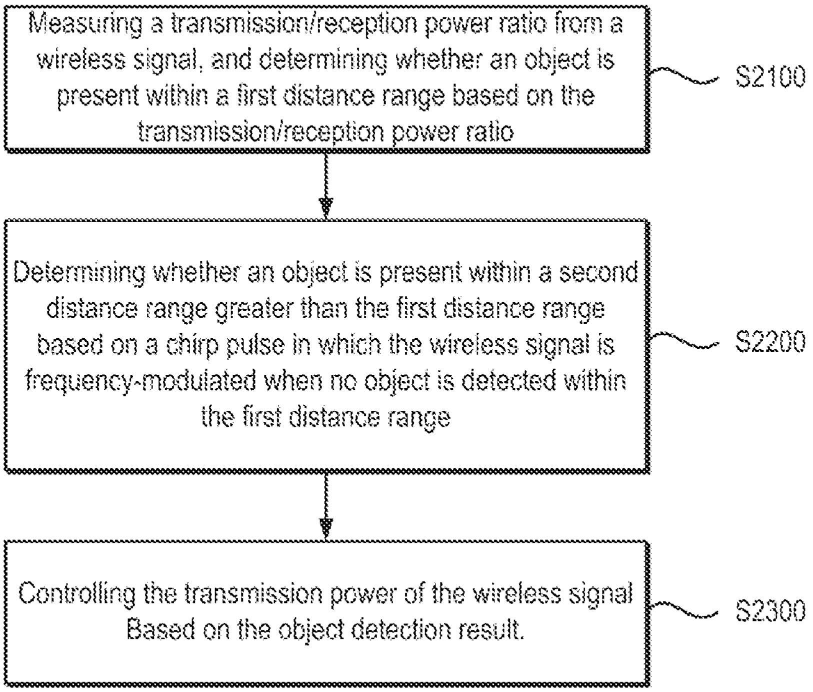
FIG. 11 is a flowchart illustrating an operation of an electronic device, according to an example embodiment.

FIG. 11 is a flowchart illustrating an operation of an electronic device, according to an example embodiment.

Referring to FIG. 11, according to an example embodiment, the electronic device 100_1 measures a transmission/reception power ratio from a wireless signal and determining whether an object is present within a first distance range based on the transmission/reception power ratio (S2100).

When the object is not detected within a first distance range in S2100, the electronic device 100_1 detects whether an object is present within a second distance range greater than the first distance range, based on a chirp pulse in which the wireless signal is frequency-modulated (S2200). For example, operation S2200 may be understood as corresponding to the above-described FMCW radar-based object detection.

The electronic device 100_1 controls transmission power of the wireless signal, based on the object detection result in S2100 to S2200 (S2300). For example, the electronic device 100_1 may control the wireless signal to transmit with the first power, when the object is detected within the first distance range in operation S2100, and control the transceiver 110 to transmit the wireless signal with the second power greater than the first power, when the object is detected within the second distance range in operation S2200.

Figure 12:
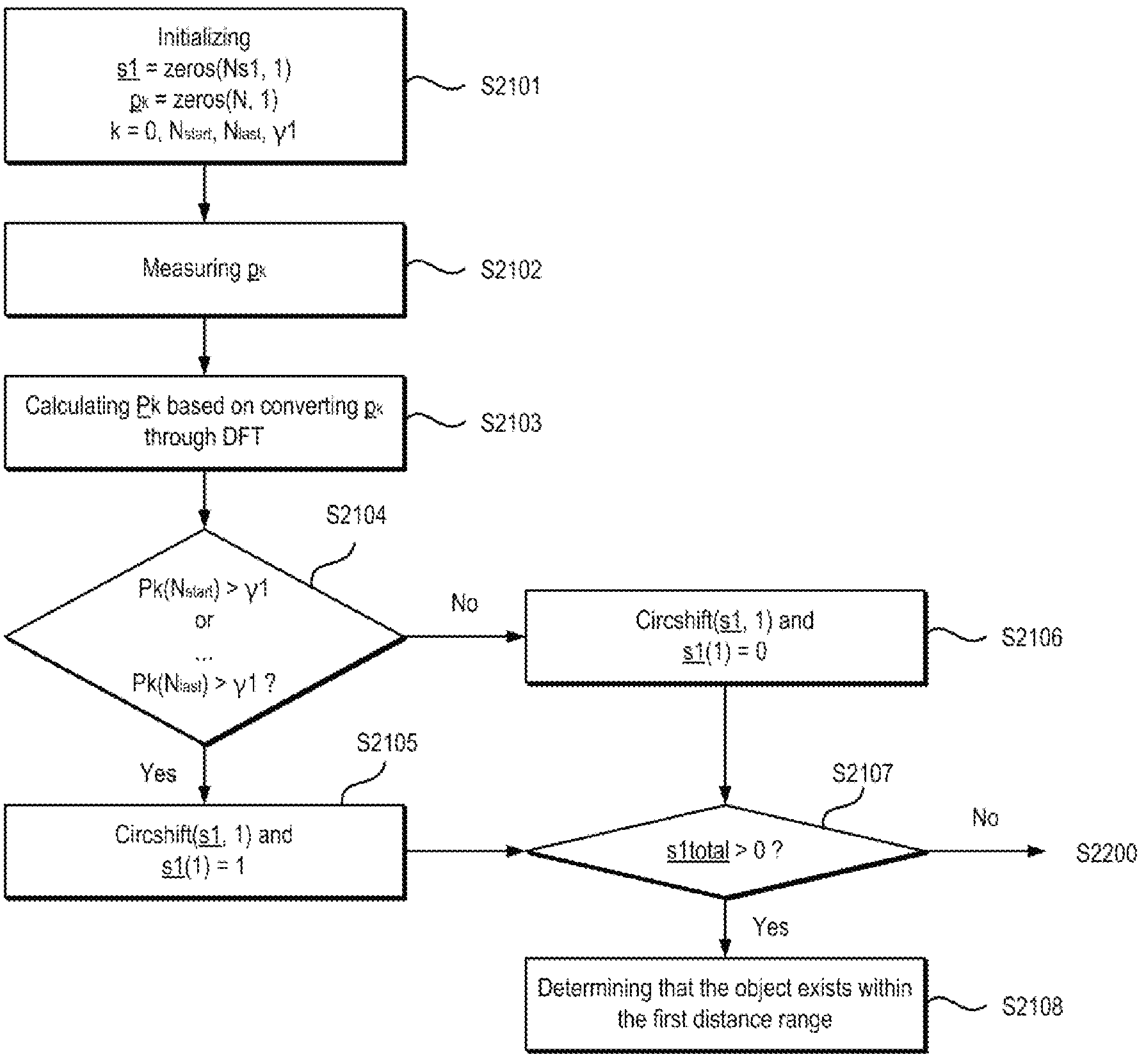
FIG. 12 is a flowchart illustrating a method of operating a first detector, according to an example embodiment.

FIG. 12 is a flowchart illustrating a method of operating a first detector, according to an example embodiment.

Referring to FIG. 12, according to one example embodiment, the first detector 120 may initialize a first history vector "s1", which includes transmission/reception power ratios collected and measured in time series for a wireless signal and has the size of (Ns1, 1), to "0", in which Ns1 is the number of data samples included in the first history vector. The first detector 120 may initialize a transmission/reception power ratio vector "pk", which includes a transmission/reception power ratio corresponding to a specific time window, and has the size (N, 1), to "0", in which "N" is the number of data samples included in a specific time window, and Ns1>>N. The first detector 120 may also set k, $N_{start}$, $N_{last}$, and the first threshold "γ1" (S2101).

In this case, the first history vector "s1" is a vector indicating whether an object is detected in the Ns1 data samples included in the first history vector, and defined as $\underline{p}_k=[p[kT_s]\ p[(k+1)T_s] \ldots p[(k+n)T_s] \ldots p[(k+N-1)T_s]]^T$, in which p[nTs] is the transmission/reception power ratio as the n-th power measurement result, k is an integer of '0' or more, and Ts is a sample interval.

According to an example embodiment, the first detector 120 may set Ns1 to satisfy "the maximum sample interval ($T_{max,\ stan}$)=Ns1*Ts".

The first detector 120 may set the first threshold "γ1" according to various example embodiments described above. For example, the first detector 120 may calculate a noise level and set the first threshold "γ1" based on the noise level and a tuning parameter.

The first detector 120 may measure the transmission/reception power ratio vector "pk" (S2102).

The first detector 120 may convert the measured transmission/reception power ratio vector "pk" into frequency domain data "Pk" (S2103). For example, the first detector 120 may perform conversion to the frequency domain through DFT.

The first detector 120 compares the frequency domain data "Pk" obtained through the transformation into the frequency domain, with the first threshold "γ1" (S2104). For example, the first detector 120 may sequentially compare the transformed frequency domain Pk($N_{start}$), . . . , and Pk($N_{last}$) with the first threshold "γ1", during a time duration "$N_{start}$" to "$N_{last}$" included in a specific time window "N".

In S2103, when determining the size of at least one of the frequency domain data Pk($N_{start}$), . . . , and Pk($N_{last}$) as exceeding the first threshold "γ1", the first detector 120 may perform a circulation shift operation (Circshift) on the first history vector "s1", and set the first value of the first history vector "s1" to "1" (S2105).

Alternatively, in S2103, when neither of the frequency domain data Pk($N_{start}$), . . . , and Pk($N_{last}$) is determined as exceeding the first threshold "γ1", the first detector 120 may perform a circulation shift operation (Circshift) with respect to the first history vector "s1" and set the first value of the first history vector "s1" to "0" (S2106). In this case, when the first history vector "s1" is "1", an object is detected, and when the first history vector "s1" is "0", the object is not detected.

After S2105 or S2106, the first detector 120 determines whether "$s_{1total}$" is greater than "0" (S2107). In this case, "$s_{1total}$" may be defined as $$\sum_{n=1}^{Ns1} \underline{s1}(n).$$

When determining "$s_{1total}$" is greater than "0" in S2107, the first detector 120 determines that an object is detected within the first distance range during Ns1 (S2108). In particular, when Ns1 is set based on the maximum sample interval, the first detector 120 determines the human body is detected when "$s_{1total}$" is greater than "0".

When determining "$s_{1total}$" is equal to or less than "0" in S2107, the S2200 described above may be performed.

The above-described S2101 to S2107 may be iteratively performed while k is increased by "1".

Figure 13:
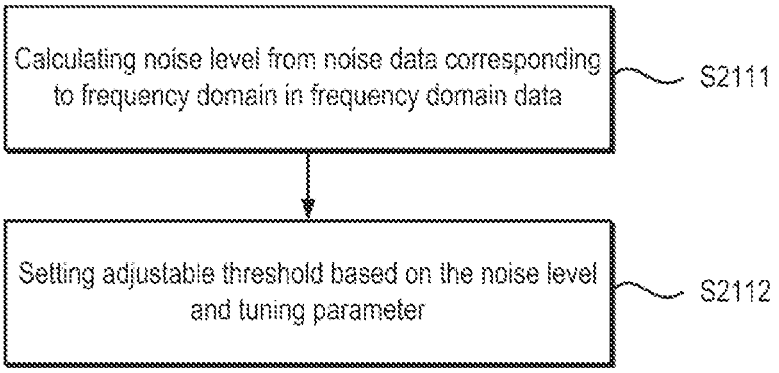
FIG. 13 is a flowchart illustrating a method of operating a first detector, according to another example embodiment.

FIG. 13 is a flowchart illustrating a method of operating a first detector, according to another example embodiment.

Referring to FIG. 13, according to an example embodiment, the first detector 120 calculates a noise level based on noise data, which corresponds to a noise frequency area, in the frequency domain data (S2111). For example, the first detector 120 may calculate the noise level through $$\text{noise}(\underline{P}_k) = \frac{1}{N_{noise}} \sum_{m=1}^{N_{noise}} \underline{P}_k(m)$$

based on the noise data included in the noise frequency area illustrated in FIG. 3B.

The first detector 120 may set an adjustable threshold based on the noise level and a tuning parameter (S2112). For example, the first detector 120 may adjust the recognition rate of the object by adjusting the tuning parameter to set the threshold. For example, the first detector 120 may reduce a misrecognition rate of the object by adjusting the tuning parameter to be a greater value, or may reduce an unrecognized rate of the object by adjusting the tuning parameter to be a lesser value.

Figure 14:
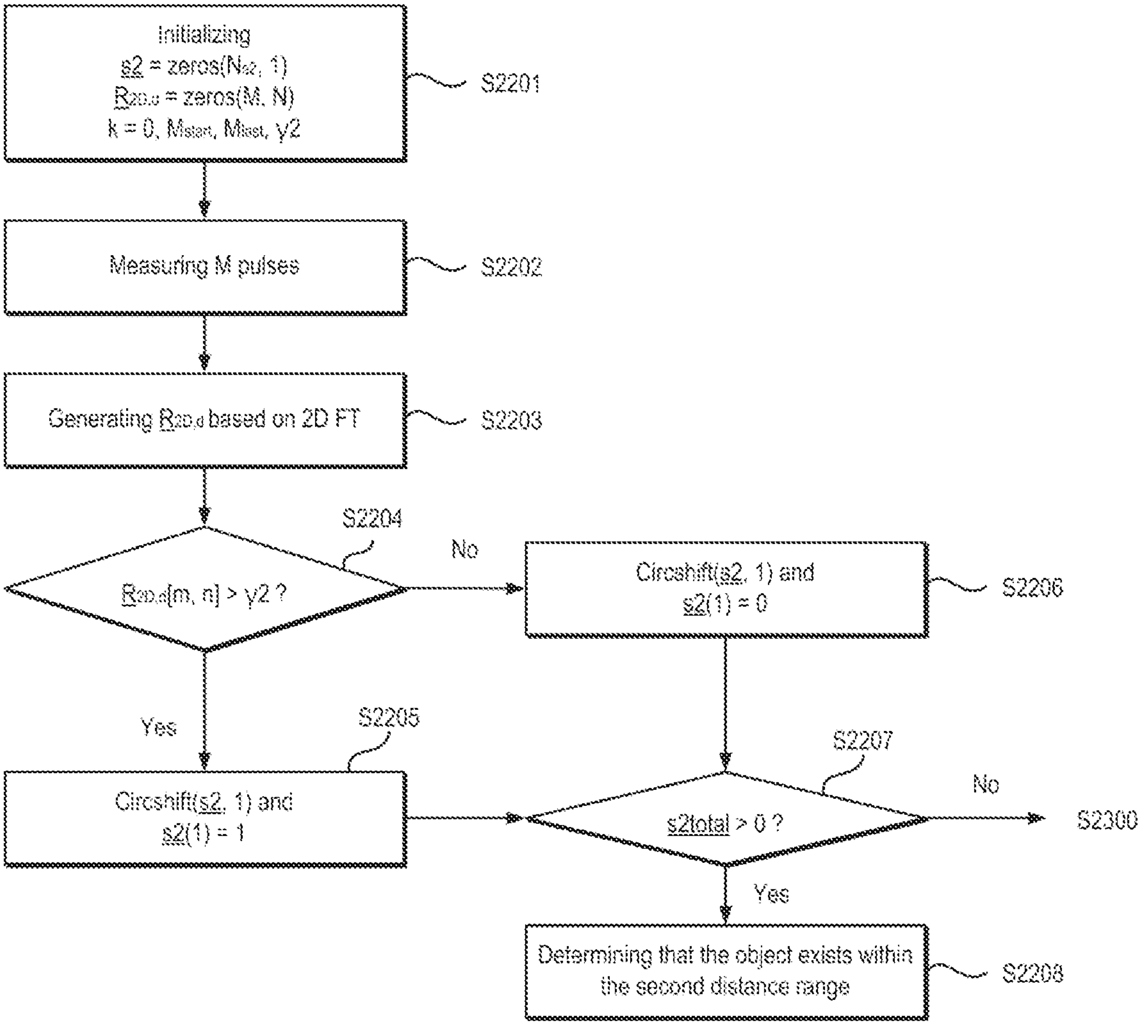
FIG. 14 is a flowchart illustrating a method of operating a second detector, according to an example embodiment.

FIG. 14 is a flowchart illustrating a method of operating a second detector according to an example embodiment.

Referring to FIG. 14, according to an example embodiment, the second detector 130 may initialize a second history vector "s2" having the size (Ns2, 1) to "0" (in which Ns2" is the number of data samples included in the second history vector, and may set Ns2>>M×N). The second detector 130 may initialize a vector "$R_{2D,d}$", which is the 2D Fourier transform result, having the size of M×N to "0", and may set k, $M_{start}$, $M_{last}$, and a second threshold "γ2" (S2201).

In this case, the second history vector "s2" is a vector indicating whether an object is detected in the Ns2 data samples included in second history vector.

The second detector 130 may measure "M" number of pulses which are reception radar signals (S2202). The "M" number of pulses correspond to the chirp pulses described above.

The second detector 130 generates the vector "$R_{2D,d}$" which is the 2D Fourier transform result by 2D Fourier transforming the measurement results of "M" number of pulses (S2203).

The second detector 130 compares $R_{2D,d}$[m, n], which is the 2D Fourier transform result with the second threshold "γ2" (S2204). In this case, "m", "n", and "γ2" may vary depending on a speed index range, a distance index range, and a sample to be determined in the FMCW radar system. In particular, "γ2" may vary depending on neighboring values of the comparison component. For example, when n=0, the second detector 130 may sequentially compare $R_{2D,d}[M_{start}, 0]$, . . . , and $R_{2D,d}[M_{last}, 0]$, which are 2D Fourier transform results of $M_{start}$ to $M_{last}$ included in "m", with the second threshold "γ2".

In S2204, when determining the size of at least one of the 2D Fourier transform results exceeds the second threshold "γ2", the second detector 130 may perform a circulation shift operation (Circshift) with respect to the second history vector "s2" and may set the first value of the second history vector "s2" to "1" (S2205).

Alternatively, when determining neither of the 2D Fourier transform results as exceeding the second threshold "γ2" in S2204, the second detector 130 may perform a circulation shift operation (Circshift) with respect to the second history vector "s2" and may set the first value of the second history vector "s2" to "0" (S2206). In this case, when the second history vector "s2" is 1, an object is detected, and when the second history vector "s2" is "0", the object is not detected.

After S2205 or S2206, the second detector 130 determines whether "$s_{2total}$" is greater than "0" (S2107). In this case, "$s_{2total}$" may be defined as $$\sum_{n=1}^{Ns2} \underline{s2}(n).$$

When determining "$s_{2total}$" is greater than "0" in S2207, the second detector 130 determines the object is detected within the second distance range during Ns2 (S2208). In particular, when Ns2 is set based on the maximum sample interval, and when "$s_{2total}$" is greater than "0", the second detector 130 determines the human body is detected.

When "$s_{2total}$" is determined is equal to or less than "0" in S2207, the above-described operation S2300 may be performed.

Figure 15:
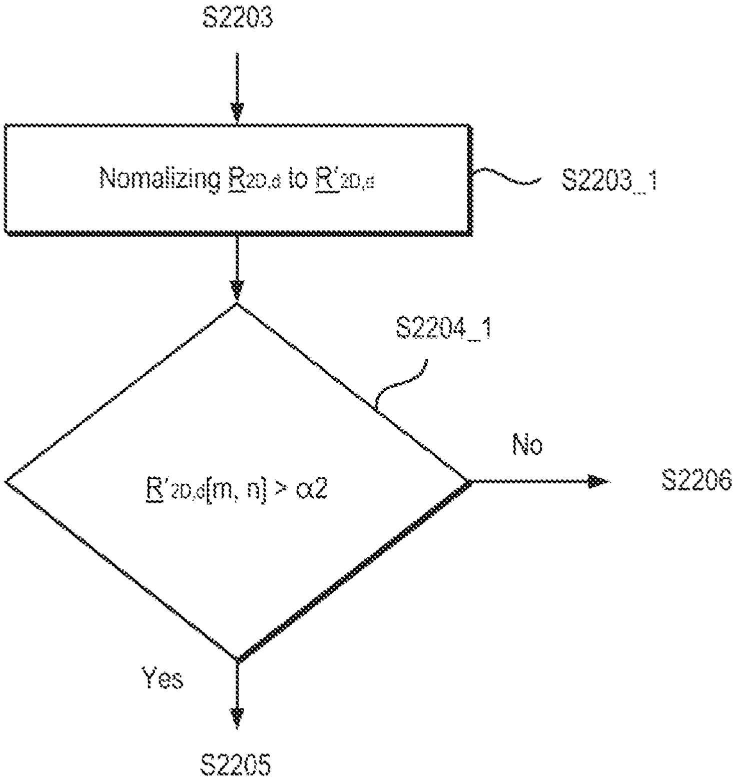
FIG. 15 is a flowchart illustrating a method of operating a second detector, according to another example embodiment.

FIG. 15 is a flowchart illustrating a method of operating a second detector according to another example embodiment.

Referring to FIG. 15, according to another example embodiment, the second detector 130 may additionally perform an operation of normalizing frequency domain data in addition to the operation illustrated in FIG. 14 (S2203_1). For example, the second detector 130 may obtain normalized data "$R'_{2D,d}$" by dividing the 2D Fourier transform results "$R_{2D,d}$" by a noise level.

The second detector 130 compares the obtained normalized data $R'_{2D,d}$ with the threshold factor "α2" (S2204_1). For example, the second detector 130 sequentially compares normalized data $R'_{2D,d[m,\ n]}$ transformed from $M_{start}$ to $M_{last}$ with the threshold factors "α2", respectively.

Thereafter, according to the determination result, the second detector 130 may perform S2205, when at least one normalized data exceeds the threshold factor "α2", and may perform operation S2206 when all normalized data do not exceed the threshold factor "α2".

Figure 16:
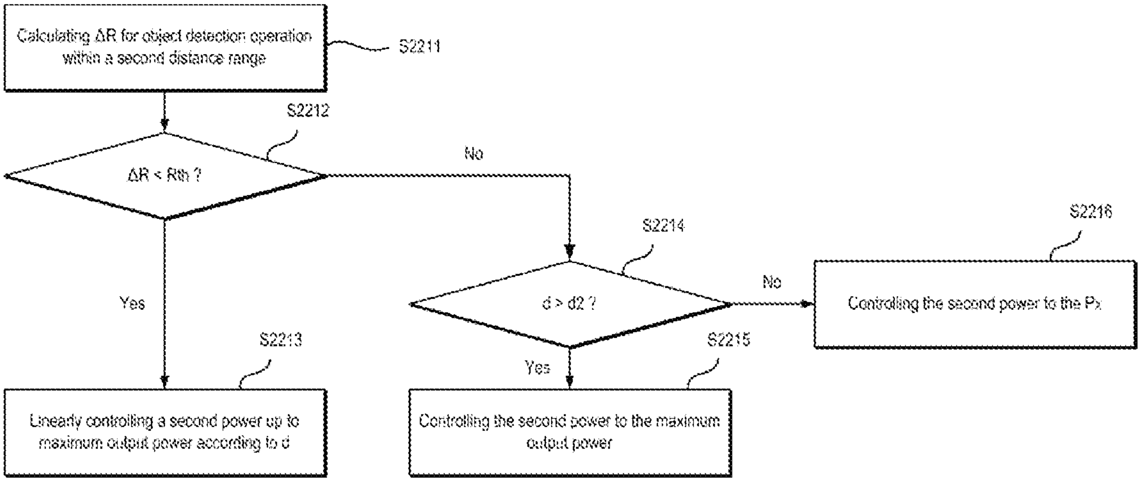
FIG. 16 is a flowchart illustrating a method of operating a controller, according to another example embodiment.

FIG. 16 is a flowchart illustrating an operating method of a controller, according to another example embodiment.

Referring to FIG. 16, according to another example embodiment, when an object is detected within a second distance range, the controller 140 controls a wireless signal to be transmitted with second power greater than the first power.

Specifically, the controller 140 calculates a distance resolution for an operation of detecting an object within a second distance range (S2211).

The controller 140 compares the calculated distance resolution with the preset distance resolution value (S2212).

When the distance resolution is less than a preset distance resolution value in operation S2212, the controller 140 linearly controls the second power to the maximum output power depending on the detection distance "d" (S2213).

When the distance resolution is greater than or equal to a preset distance resolution value in S2212, the controller 140 determines whether the object is detected in the maximum distance range included in the second distance range (S2214). For example, the controller 140 determines whether the detection distance "d" exceeds the distance "d2" as illustrated in FIGS. 10A and 10B.

In operation S2214, the controller 140 controls the second power to the maximum power, only when the object is determined is detected in the maximum distance range (S2215).

When an object is detected within a range of d1 to d2 rather than a maximum distance range, the controller 140 controls the second power to "PX" (S2216).

Example Application

Figure 17:
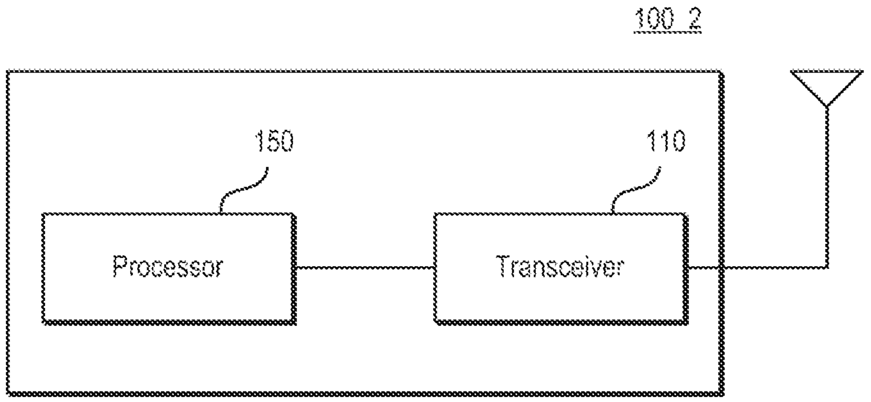
FIG. 17 illustrates an electronic device, according to another example embodiment.

FIG. 17 illustrates an electronic device, according to another example embodiment.

Referring to FIG. 17, according to another example embodiment, an electronic device 100_2 includes a transceiver 110 and a processor 150.

The transceiver 110 may transmit and receive a wireless signal and may correspond to the transceiver 110 of FIG. 1. The processor 150 is electrically connected to the transceiver 110 to control the transceiver 110 or to perform operations for controlling the transceiver 110.

At least one processor 150 may be provided to control the transceiver 110, and may be configured to implement the description, function, procedure, suggestion, method, and/or operation flowcharts of the present disclosure. For example, the processor 150 may receive a signal through the transceiver 110 and store information included in the signal or data in a memory. In addition, the processor 150 may process information stored in the memory to generate a signal, and then transmit the generated signal through the transceiver 110. The processor 150 may perform some or all of the processes controlled by the processor 150, or may perform various example embodiments, based on a memory having software code including instructions for performing descriptions, functions, procedures, suggestions, methods, and/or operating procedures.

According to an example embodiment, the processor 150 may be configured to perform operations performed by at least one of the first detector 120, the second detector 130, and the controller 140 of FIG. 1, or operations of the electronic device according to various example embodiments described above. For example, the processor 150 may measure the transmission/reception power ratio from a wireless signal, may detect an object within a first distance range based on the transmission/reception power ratio, may detect the object within a second distance range greater than the first distance range, based on a chirp pulse obtained by frequency-modulating the wireless signal, when the object is not detected in the first distance range, and may control the transmission power of the wireless signal depending on the object detection result.

According to example embodiments, the nearer object may be detected through a transmission/reception power ratio-based detection scheme based on a physical characteristic of the transmission/reception power ratio, and the object even within the distance range to deteriorate detection performance when employing transmission/reception power ratio-based detection scheme may be detected through an FMCW radar detection scheme.

In addition, according to an example embodiment, the transmission/reception power ratio-based detection scheme deteriorating the detection performance of the object out of the short distance is supplemented with FMCW radar detection scheme having a difficulty in signal processing for an object in the short distance.

While aspects of example embodiments have been particularly shown and described, it will be understood that various changes in form and details may be made therein without departing from the spirit and scope of the following claims.

What is claimed is:

1. An electronic device comprising:
a transceiver configured to transmit or receive a wireless signal; and
a processor configured to:
control a first detector to set a first threshold based on a noise level, and detect whether an object is within a first distance range, based on a transmission/reception power ratio of the wireless signal and the first threshold;
control a second detector to detect, based on the object not being detected within the first distance range, whether the object is within a second distance range outside the first distance range, based on a chirp pulse, which is obtained by frequency-modulating the wireless signal; and
control transmission power of the wireless signal, based on whether the object is detected by the first detector or the second detector.

2. The electronic device of claim 1, wherein the processor is further configured to:
control the transceiver to transmit the wireless signal with first power, based on the object being detected within the first distance range; and
control the transceiver to transmit the wireless signal with second power greater than the first power, based on the object being detected in the second distance range.

3. The electronic device of claim 2, wherein the processor is further configured to:
identify a distance resolution of the second detector; and
control the second power to linearly increase to a maximum output power, based on the distance resolution being less than a preset distance resolution value.

4. The electronic device of claim 3, wherein the processor is further configured to control the second power to the maximum output power, based on the distance resolution being equal to or greater than the preset distance resolution value, and the object being detected at a maximum distance range included in the second distance range.

5. The electronic device of claim 1, wherein the processor is further configured to control the first detector to:
transform the transmission/reception power ratio into frequency domain data; and
detect the object based on the frequency domain data and the first threshold.

6. The electronic device of claim 5, wherein the processor is further configured to control the first detector to:
identify the noise level based on noise data, which corresponds to a noise frequency bandwidth of the frequency domain data; and
identify the first threshold based on the noise level and a tuning parameter.

7. The electronic device of claim 5, wherein the processor is further configured to control the first detector to:
identify the object is within the first distance range, based on the frequency domain data exceeding the first threshold; and
determine the object is outside the first distance range, based on the frequency domain data being equal to or less than the first threshold.

8. The electronic device of claim 1, wherein the processor is further configured to control the second detector to:
perform a two dimension (2D) Fourier transform with respect to the chirp pulse, in a first dimension corresponding to a number of transmission chirp pulses and a second dimension corresponding to a number of samples included in the chirp pulse; and
detect the object based on a 2D Fourier transform result and a second threshold.

9. The electronic device of claim 8, wherein the processor is further configured to control the second detector to:
identify the object is present in the second distance range, based on the 2D Fourier transform result exceeding the second threshold; and
identify the object is absent, based on the 2D Fourier transform result being equal to or less than the second threshold.

10. The electronic device of claim 8, wherein the processor is further configured to control the second detector to detect the object with respect to a maximum sample interval defined as a maximum stop time, based on the object being a human body; and
identifying the object is present in the second distance range, based on any one component of the 2D Fourier transform result exceeding the second threshold, during the maximum sample interval.

11. An operating method performed by an electronic device, the operating method comprising:
setting a first threshold based on a noise level;
detecting whether an object is within a first distance range, based on a transmission/reception power ratio of a wireless signal and the first threshold;
detecting, based on the object not being detected within the first distance range, whether the object is within a second distance range outside the first distance range, based on a chirp pulse, which is obtained by frequency-modulating the wireless signal; and
controlling transmission power of the wireless signal, based on whether the object is detected within the first distance range or the second distance range.

12. The operating method of claim 11, wherein the controlling comprises:
transmitting the wireless signal with first power, based on the object being detected within the first distance range; and
transmitting the wireless signal with second power greater than the first power, based on the object being detected within the second distance range.

13. The operating method of claim 12, further comprising identifying a distance resolution with respect to the detecting whether the object is within the second distance range, wherein the controlling comprises controlling the second power to linearly increase to a maximum output power, based on the distance resolution being less than a preset distance resolution value.

14. The operating method of claim 13, wherein the controlling comprises controlling the second power to increase to the maximum output power, based on the distance resolution being equal to or greater than the preset distance resolution value, and the object being detected at a maximum distance range included in the second distance range.

15. The operating method of claim 11, wherein the detecting whether the object is within the second distance range comprises:

performing a two dimension (2D) Fourier transform with respect to the chirp pulse, in a first dimension corresponding to a number of transmission chirp pulses and a second dimension corresponding to a number of samples included in the chirp pulse; and detecting the object based on a 2D Fourier transform result and a second threshold.

16. The operating method of claim 15, wherein the detecting whether the object is within the second distance range comprise:

identifying the object is present in the second distance range, based on the 2D Fourier transform result exceeding the second threshold; and identifying the object is absent, based on the 2D Fourier transform result being equal to or less than the second threshold.

17. The operating method of claim 15, wherein the detecting whether the object is within the second distance range comprises:

detecting the object with respect to a maximum sample interval defined as a maximum stop time, based on the object being a human body; and identifying the object is present in the second distance range, based on any one component of the 2D Fourier transform result exceeding the second threshold, during the maximum sample interval.

18. An electronic device comprising:

a transceiver configured to transmit/receive a wireless signal; and a processor configured to:

set a first threshold based on a noise level;

detect whether an object is within a first distance range, based on a transmission/reception power ratio of the wireless signal and the first threshold;

detect, based on the object not being detected within the first distance range, whether the object is in a second distance range outside the first distance range, based on a chirp pulse, which is obtained by frequency-modulating the wireless signal; and control transmission power of the wireless signal, based on whether the object is detected within the first distance range or the second distance range.

19. The electronic device of claim 18, wherein the processor is configured to:

control the transceiver to transmit the wireless signal with first power, based on the object being detected within the first distance range; and control the transceiver to transmit the wireless signal with second power greater than the first power, based on the object being detected within the second distance range.

20. The electronic device of claim 18, wherein the processor is configured to:

perform a two dimension (2D) Fourier transform with respect to the chirp pulse, in a first dimension corresponding to a number of transmission chirp pulses and a second dimension corresponding to a number of samples included in the chirp pulse; and detect the object based on a 2D Fourier transform result and a second threshold.

* * * * *